(12) United States Patent
Hinds et al.

(10) Patent No.: US 12,225,068 B2
(45) Date of Patent: Feb. 11, 2025

(54) IMMERSIVE MEDIA STREAMING PRIORITIZED BY FREQUENCY OF ASSET REUSE

(71) Applicant: TENCENT AMERICA LLC, Palo Alto, CA (US)

(72) Inventors: Arianne Hinds, Palo Alto, CA (US); Rohit Abhishek, San Jose, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/443,855

(22) Filed: Feb. 16, 2024

(65) Prior Publication Data

US 2024/0275835 A1    Aug. 15, 2024

Related U.S. Application Data

(63) Continuation of application No. 17/971,057, filed on Oct. 21, 2022, now Pat. No. 11,930,059.

(60) Provisional application No. 63/276,536, filed on Nov. 5, 2021.

(51) Int. Cl.
*H04L 65/611* (2022.01)
*H04L 65/61* (2022.01)

(52) U.S. Cl.
CPC ............ *H04L 65/61* (2022.05); *H04L 65/611* (2022.05)

(58) Field of Classification Search
CPC ............................... H04L 65/61; H04L 65/611

USPC ......................................................... 709/231
See application file for complete search history.

(56) References Cited

U.S. PATENT DOCUMENTS

| 2015/0346832 | A1* | 12/2015 | Cole | H04N 13/243 345/156 |
| 2019/0250773 | A1* | 8/2019 | Miyaki | G06F 3/04815 |
| 2020/0037029 | A1* | 1/2020 | He | G06F 3/0304 |

OTHER PUBLICATIONS

Written Opinion of the International Searching Authority dated Mar. 10, 2023 in Application No. PCT/US22/48025.
International Search Report dated Mar. 10, 2023 in Application No. PCT/US22/48025.

* cited by examiner

*Primary Examiner* — Glenford J Madamba
(74) *Attorney, Agent, or Firm* — Sughrue Mion, PLLC

(57) ABSTRACT

Packaging media for optimizing immersive media distribution of a media steam performed by at least one processor, is provided, including: receiving immersive media data for an immersive presentation; acquiring asset information associated with media assets corresponding to a set of scenes included in the immersive media data for the immersive presentation; analysing characteristics of the media assets based on the asset information, the characteristics comprising an asset type associated with a respective media asset and a frequency that indicates a number of times the respective media asset is used among the set of scenes included in the immersive presentation; ordering the media assets in a sequence based on the asset type and the frequency associated with each of the media assets; and streaming the immersive media data for the immersive presentation based on the ordered sequence of the media assets.

20 Claims, 21 Drawing Sheets

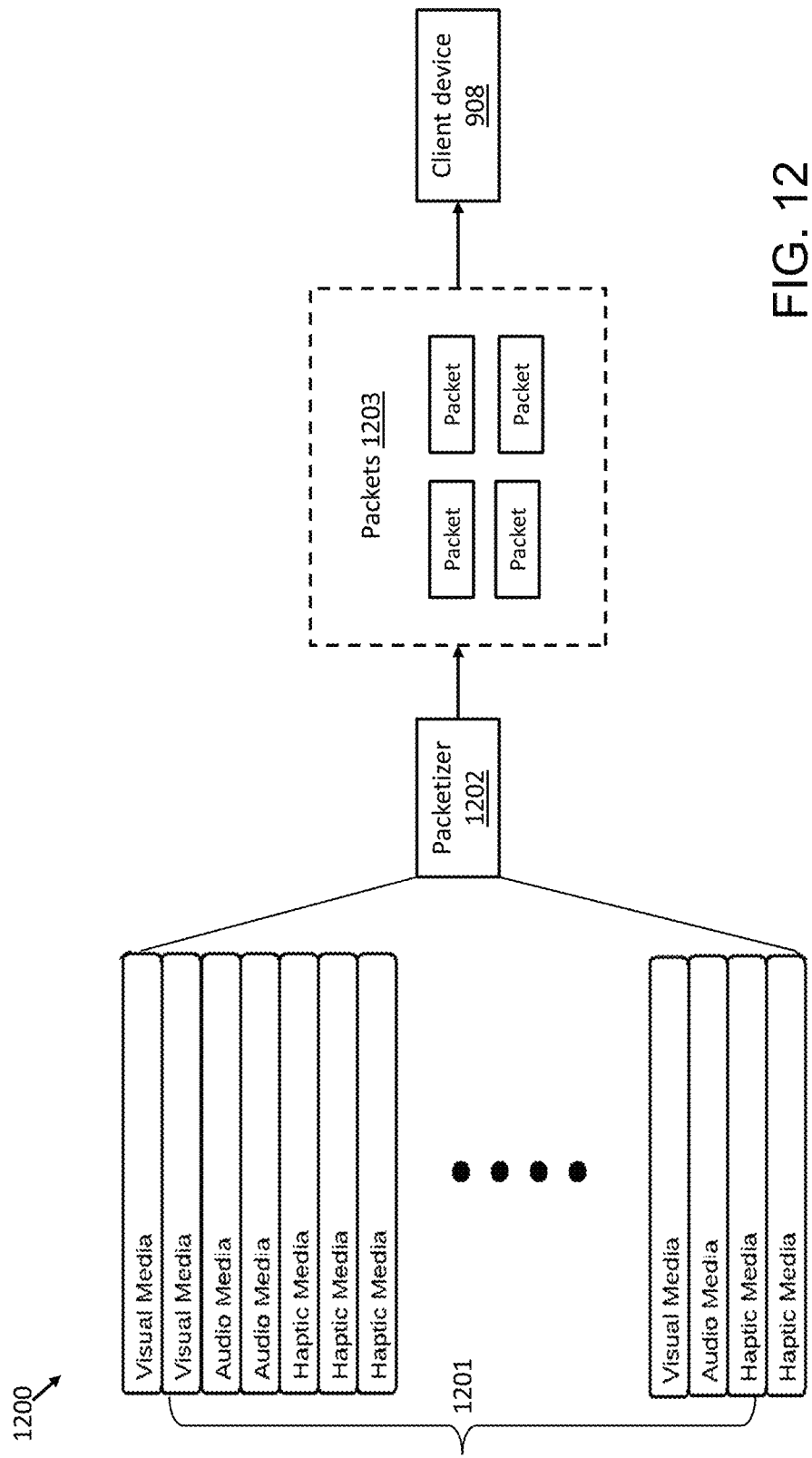

Set of Lists of Unique Assets 1420

| Scene 1 unique assets | | | Scene 2 unique assets | | | Scene N-1 unique assets | | |
|---|---|---|---|---|---|---|---|---|
| Type | Identifier | #Used | Type | Identifier | #Used | Type | Identifier | #Used |
| Mesh | MeshID1 | 1 | Haptic | HapticID1 | 2 | | | |
| Audio | AudioID1 | 4 | Audio | AudioID2 | 1 | | | |
| Volume | VolumeID1 | 2 | Mesh | MeshID2 | 2 | | | |

FIG. 14B

IMMERSIVE MEDIA STREAMING PRIORITIZED BY FREQUENCY OF ASSET REUSE

CROSS-REFERENCE TO RELATED APPLICATION

This application is a Continuation Application of U.S. application Ser. No. 17/971,057, filed on Oct. 21, 2022, which is based on and claims priority to U.S. Provisional Patent Application No. 63/276,536, filed on Nov. 5, 2021, the disclosure of which is incorporated by reference herein in its entirety.

FIELD

The present disclosure describes embodiments generally related to architectures, structures and components for systems and networks that distribute media, including video, audio, geometric (3D) objects, haptics, associated metadata, or other content for a client presentation device. Some embodiments are directed to systems, structures, and architectures for distribution of media content to heterogeneous immersive and interactive client presentation devices.

BACKGROUND

Immersive Media generally refers to media that stimulates any or all human sensory systems (e.g., visual, auditory, somatosensory, olfactory, and possibly gustatory senses) to create or enhance the perception of the user being physically present in the experience of the media, i.e., beyond what is distributed over existing (e.g., "legacy") commercial networks for timed two-dimensional (2D) video and corresponding audio; such timed media also being known as "legacy media". Immersive media may also be defined as media that attempts to create, or imitate the physical world through digital simulation of kinetics and laws of physics, thereby stimulating any or all human sensory systems so as to create the perception by the user of being physically present inside a scene that depicts a real or virtual world.

A number of immersive media-capable devices have been introduced (or poised to emerge) into the consumer market, including head-mounted displays, augmented-reality glasses, hand-held controllers, multi-view displays, haptic gloves, game consoles, holographic displays and other forms of volumetric displays. Despite the availability of these devices, a coherent end-to-end ecosystem for the distribution of immersive media over commercial networks has failed to materialize.

In related art, one of the impediments to realizing a coherent end-to-end ecosystem for distribution of immersive media over commercial networks is that the client devices that serve as endpoints for such a distribution network for immersive displays are all very diverse. Unlike a network designed only for distribution of legacy media, a network that must support a diversity of display clients (i.e., heterogeneous clients) needs a significant amount of information pertaining to the specifics of each of the client's capabilities, and the formats of the media to be distributed, before such a network can employ an adaptation process to translate the media into a format suitable for each target display and corresponding application. Such a network, at a minimum, would need access to information describing the characteristics of each target display and the complexity of the ingested media in order for the network to ascertain how to meaningfully adapt an input media source to a format suitable for the target display and application.

Therefore, methods for efficiently representing and streaming heterogeneous immersive media to varying clients are needed.

SUMMARY

According to embodiments, methods are provided for optimizing a system that distributes media assets for a set of at least one scene comprising an immersive media presentation, where media assets are ordered based on media asset characteristics such as frequency and asset type.

According to an aspect of the disclosure, a method for packaging media for optimizing immersive media distribution, performed by at least one processor, is provided. The method includes: receiving immersive media data for an immersive presentation; acquiring asset information associated with media assets corresponding to a set of scenes included in the immersive media data for the immersive presentation; analyzing characteristics of the media assets based on the asset information, the characteristics comprising an asset type associated with a respective media asset and a frequency that indicates a number of times the respective media asset is used among the set of scenes included in the immersive presentation; and ordering the media assets in a sequence based on the asset type and the frequency associated with each of the media assets.

According to another aspect of the disclosure, an device (or apparatus) for packaging media for optimizing immersive media distribution, including at least one memory configured to store computer program code and at least one processor configured to read the computer program code and operate as instructed by the computer program code, is provided. The computer program code including receiving code configured to cause at least one processor to: receiving code configured to cause the at least one processor to receive immersive media data for an immersive presentation; acquiring code configured to cause the at least one processor to acquire asset information associated with media assets corresponding to a set of scenes included in the immersive media data for the immersive presentation; analyzing code configured to cause the at least one processor to analyze characteristics of the media assets based on the asset information, the characteristics comprising an asset type associated with a respective media asset and a frequency that indicates a number of times the respective media asset is used among the set of scenes included in the immersive presentation; and sequencing code configured to cause the at least one processor to order the media assets in a sequence based on the asset type and the frequency associated with each of the media assets.

According to another aspect of the disclosure, a non-transitory computer-readable medium storing instructions that are executed by at least one processor, of a device for optimizing immersive media distribution, is provided. The instructions cause the at least one processor to: receive immersive media data for an immersive presentation; acquire asset information associated with media assets corresponding to a set of scenes included in the immersive media data for the immersive presentation; analyze characteristics of the media assets based on the asset information, the characteristics comprising an asset type associated with a respective media asset and a frequency that indicates a number of times the respective media asset is used among the set of scenes included in the immersive presentation; and order the media assets in a sequence based on the asset type and the frequency associated with each of the media assets.

Additional embodiments will be set forth in the description that follows and, in part, will be apparent from the description, and/or may be realized by practice of the presented embodiments of the disclosure.

BRIEF DESCRIPTION OF THE DRAWINGS

FIG. 12 is a schematic illustration of an exemplary packetizing process, according to embodiments.

FIG. 14B is an example of a set of lists of unique assets for scenes in a presentation, according to embodiments.

DETAILED DESCRIPTION

Figure 1A:
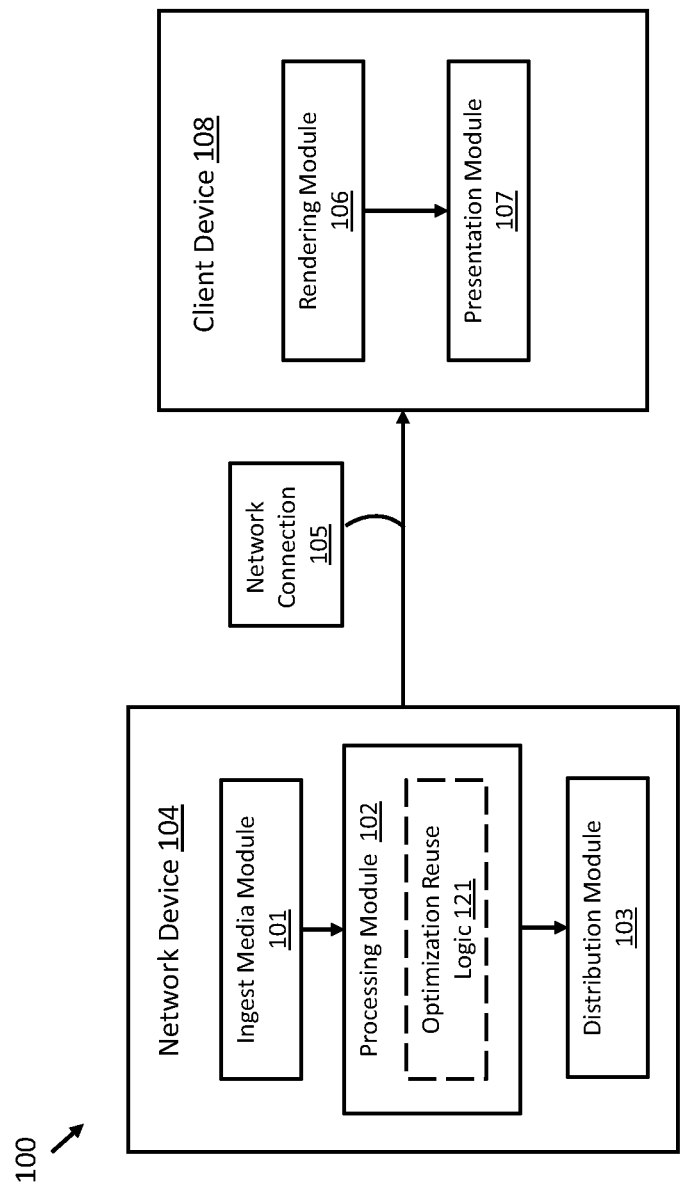
FIG. 1A is a schematic illustration of the flow of media through a network for distribution to a client, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and a device for analyzing and transforming media assets, based on media data complexity, for distribution to immersive media-capable presentation devices. Immersive media-capable presentation devices may refer to equipped with sufficient resources and capabilities to access, interpret, and present immersive media. Such devices are heterogeneous in terms of the quantities and formats of the media (provided by a network) that they may support. Likewise, media is heterogeneous in terms of the amount and type of network resources required to distribute such media at scale. "At scale" may refer to the distribution of media by service providers that achieve distribution equivalent to that of legacy video and audio media over networks (e.g., Netflix, Hulu, Comcast subscriptions, Spectrum subscriptions, etc.). In contrast, legacy presentation devices such as laptop displays, televisions, and mobile handset displays are homogenous in their capabilities because all of these devices are comprised of rectangular display screens that consume 2D rectangular video or still images as their primary visual media formats. Some of the visual media formats commonly used in legacy presentation devices may include, e.g., High Efficiency Video Coding/H.265, Advanced Video Coding/H.264, and Versatile Video Coding/H.266.

As mentioned, client devices that serve as endpoints for distribution of immersive media over a network are all very diverse. Some of them support certain immersive media formats while others do not. Some of them are capable of creating an immersive experience from legacy raster-based formats, while others cannot. To combat this issue, the distribution of any media over networks may employ media delivery systems and architectures that reformat the media from an input or network ingest media format to a distribution media format where that distribution media format is not only suitable to be ingested by the targeted client device and its applications, but is also conducive to being streamed over the network. Thus, there may be two processes that are performed by the network using the ingested media: 1) converting the media from a Format A into a Format B that is suitable to be ingested by the target client device, i.e., based upon the client device's capabilities to ingest certain media formats, and 2) preparing the media to be streamed.

In embodiments, streaming media broadly refer to the fragmenting and or packetizing of the media so that it can be delivered over the network in consecutive smaller-sized chunks logically organized and sequenced according to either or both the media's temporal or spatial structure. Transforming (sometimes referred to as "transcoding") of media from a Format A to a Format B may be a process that is performed, usually by the network or by the service provider, prior to distributing the media to the client device. Such transcoding may be comprised of converting the media from a Format A to a Format B based upon prior knowledge that Format B is a preferred format, or the only format, that can be ingested by the target client device, or is better suited for distribution over a constrained resource such as a commercial network. In many cases, but not all, both steps of transforming the media and preparing the media to be streamed are necessary before the media can be received and processed by the target client device from the network.

Converting (or transforming) the media and preparing the media for streaming are steps in a process which are acted upon the ingested media by the network prior to distributing the media to the client device. The result of the process (i.e., converting and preparing for streaming) is a media format referred to as a distribution media format, or simply, the distribution format. These steps should be performed only once, if performed at all for a given media data object, if the network has access to information to indicate that the client will need the transformed and or streamed media object for multiple occasions that otherwise would trigger the transformation and streaming of such media multiple times. That is, the processing and transfer of data for transformation and streaming of media is generally regarded as a source of latency with the requirement for expending potentially significant amount of network and or compute resources. Hence, a network design that does not have access to information to indicate when a client potentially already has a particular media data object stored in its cache or stored locally with respect to the client, will perform suboptimally to a network that does have access to such information.

An ideal network supporting heterogeneous clients should leverage the fact that some of the assets that are adapted from an input media format to a specific target format may be reused across a set of similar display targets. That is, some assets, once converted to a format suitable for a target display may be reused across a number of such displays that have similar adaptation requirements. Therefore, according to embodiments, such an ideal network may employ a caching mechanism to store adapted assets into an area that is relatively, e.g., similar to the use of Content Distribution Networks (CDNs) in legacy networks.

Immersive media may be organized into scenes that are described by scene graphs, which are also known as scene descriptions. In embodiments, a scene (in the context of computer graphics) is a collection of objects (e.g., 3D assets), object attributes, and other metadata that comprise the visual, acoustic, and physics-based characteristics describing a particular setting that is bounded either by space or time with respect to the interactions of the objects within that setting. A scene graph is a general data structure commonly used by vector-based graphics editing applications and modern computer games, which arranges the logical and often (but not necessarily) spatial representation of a graphical scene. A scene graph may be comprised of a collection of nodes and vertices in a graph structure. The nodes may be comprised of information related to the logical, spatial, or temporal representation of visual, audio, haptic, olfactory, gustatory, or related processing information. Each node shall have at most one output edge, zero or more input edges, and at least one edge (either input or output) connected to it. Attributes or object attributes refer to metadata associated with a node used to describe a particular characteristic or feature of that node either in a canonical or more complex form (e.g. in terms of another node). The scope of a scene graph is to describe visual, audio, and other forms of immersive assets that comprise a particular setting that is part of a presentation, for example, the actors and events taking place in a particular location in a building that is part of a presentation (e.g., a movie). A list of all scenes that comprise a single presentation may be formulated into a manifest of scenes.

An additional benefit of employing a caching mechanism to store adapted assets is that for content that is prepared in advance of having to distribute the content, a bill of materials can be created. The bill of materials identifies all of the assets that will be used for the entire presentation, and how often each asset is used among the various scenes within the presentation. An ideal network should have knowledge of the existence of cached resources that may be used to satisfy the asset requirements for a particular presentation. Similarly, a client device that is presenting a series of scenes may wish to have knowledge about the frequency of any given asset to be used across multiple scenes. For example, if a media asset (also known as a media object) is referenced multiple times across multiple scenes that are or will be processed by the client device, then the client device should avoid discarding the asset from its caching resources until the last scene that requires that particular asset has been presented by the client device. In embodiments of the present disclosure, the terms media "object" and media "asset" may be used interchangeably, both referring to a specific instance of a specific format of media data.

For legacy media presentation devices, the distribution format may be equivalent or sufficiently equivalent to the "presentation format" ultimately used by the client presentation device to create the presentation. That is, a presentation media format is a media format whose properties (e.g., resolution, framerate, bit-depth, color gamut, etc.) are closely tuned to the capabilities of the client presentation device. Examples of a distribution vs. presentation format include: a High-Definition (HD) video signal (1920 pixel columns×1080 pixel rows) distributed by a network to an Ultra-high-definition (UHD) client device with resolution (3840 pixel columns×2160 pixel rows). In the aforementioned example, the UHD client device will apply a super-resolution process to the HD distribution format to increase the resolution of the video signal from HD to UHD. Thus, the final signal format that is presented by the client device is the "presentation format" which, in this example, is a UHD signal, whereas the HD signal comprises the distribution format. In this example, the HD signal distribution format is very similar to the UHD signal presentation format because both signals are in a rectilinear video format, and the process to convert the HD format to a UHD format is a relatively straightforward and easy to perform on most legacy media client devices.

In some embodiments, the preferred presentation format for the client device may be significantly different from the ingest format received by the network. Nevertheless, the client device may have access to sufficient compute, storage, and bandwidth resources to transform the media from the ingest format into the necessary presentation format suitable for presentation by the client device. In this scenario, the network may bypass the step of reformatting or transcoding the ingested media from a Format A to a Format B simply because the client device has access to sufficient resources to perform all media transforms without the network having to do so a prioi. However, the network may still perform the step of fragmenting and packaging the ingest media so that the media may be streamed over the network to the client device.

In some embodiments, the ingested media may be significantly different from the client's preferred presentation format, and the client device may not have access to sufficient compute, storage, and or bandwidth resources to transform the media from the ingest format into the preferred presentation format. In such a scenario, the network may assist the client by performing some or all of the transformation from the ingest format into a format that is either equivalent or nearly equivalent to the client's preferred presentation format on behalf of the client device. In some architecture designs, such assistance provided by the network on behalf of the client device is commonly referred to as split rendering.

FIG. 1A is a schematic illustration a media flow process 100 through a network for distribution to a client, according to some embodiments. FIG. 1A shows an example processing of media in a format A (hereafter "ingest media Format A"). The processing (i.e., media flow process 100) may be performed or executed by a network cloud or edge device (hereafter "network device 104") and distributed to a client, for example client device 108. In some embodiments, the same processing may be performed a prioi in a manual process or by a client device. The network device 104 may include an ingest media module 101, a network processing module 102 (hereafter "processing module 102"), and a distribution module 103. The client device 108 may include a rendering module 106 and a presentation module 107.

First, the network device 104 receives ingested media from a content provider or the like. Ingest media module 101 obtains the ingested media that is stored in an ingest media Format A. The network processing module 102 performs any necessary transformations or conditioning of the ingested media to create a potentially alternative representation of the media. That is, the processing module 102 creates a distribution format for media objects in the ingest media. As mentioned, the distribution format is a media format that may be distributed to the client by formats the media into a distribution Format B. The distribution Format B is a format that is prepared to be streamed to the client device 108. The processing module 102 may include an optimization reuse logic 121 to perform a decision making process to determine if a particular media object has already been streamed to the client device 108. Operations of the processing module 102 and the optimization reuse logic 121 will be described in detailed with reference to FIG. 1B.

Media Formats A and B may or may not be representations following the same syntax of a particular media format specification, however the Format B is likely to be conditioned into a scheme that facilitates the distribution of the media over a network protocol. The network protocol may be, e.g., a connection oriented protocol (TCP) or a connectionless protocol (UDP). The distribution module 103 streams the streamable media (i.e., media Format B) from the network device 104 to the client device 108 via a network connection 105.

The client device 108 receives the distribution media and optionally prepares the media for presentation via the rendering module 106. The rendering module 106 has access to some rendering capabilities which may be rudimentary or likewise, sophisticated, depending on the client device 108 that is being targeted. The rendering module 106 creates presentation media in presentation format C. The presentation format C may or may not be represented according to a third format specification. Therefore, the presentation format C may be the same or different from media formats A and/or B. The rendering module 106 outputs the presentation format C to the presentation module 107, which may present the presentation media in a display (or the like) of the client device 108.

Embodiments of the present disclosure facilitate a decision making process that is employed by a network to compute a sequence order in which to package and stream assets from a network to a client. In this case, all assets that are utilized across the set of one or more scenes that comprise a presentation, are analyzed by a media reuse analyzer to determine the frequency by which each asset is used throughout all scenes that comprise the presentation. The order in which assets for a particular scene are packaged and streamed to a client may therefore be based on the frequency by which each asset is used across the set of scenes that comprise a presentation.

Embodiments address the need for a mechanism or process that analyzes an immersive media scene to obtain sufficient information that may be used to support a decision making process that, when employed by a network or a client, provides an indication as to whether the transformation of a media object from a Format A to a Format B should be performed either entirely by the network, entirely by the client, or via a mixture of both (along with an indication of which assets should be transformed by the client or network). Such an immersive media data complexity analyzer may be employed by either a client or a network in an automated context, or by manually by, e.g., a human operating the system or device.

According to embodiments, the process of adapting an input immersive media source to a specific endpoint client device may be the same as, or similar to, the process of adapting the same input immersive media source to the specific application that is being executed on the specific client endpoint device. Therefore, the problem of adapting an input media source to the characteristics of an endpoint device are of the same complexity as the problem of adapting a specific input media source to the characteristics of a specific application.

Figure 1B:
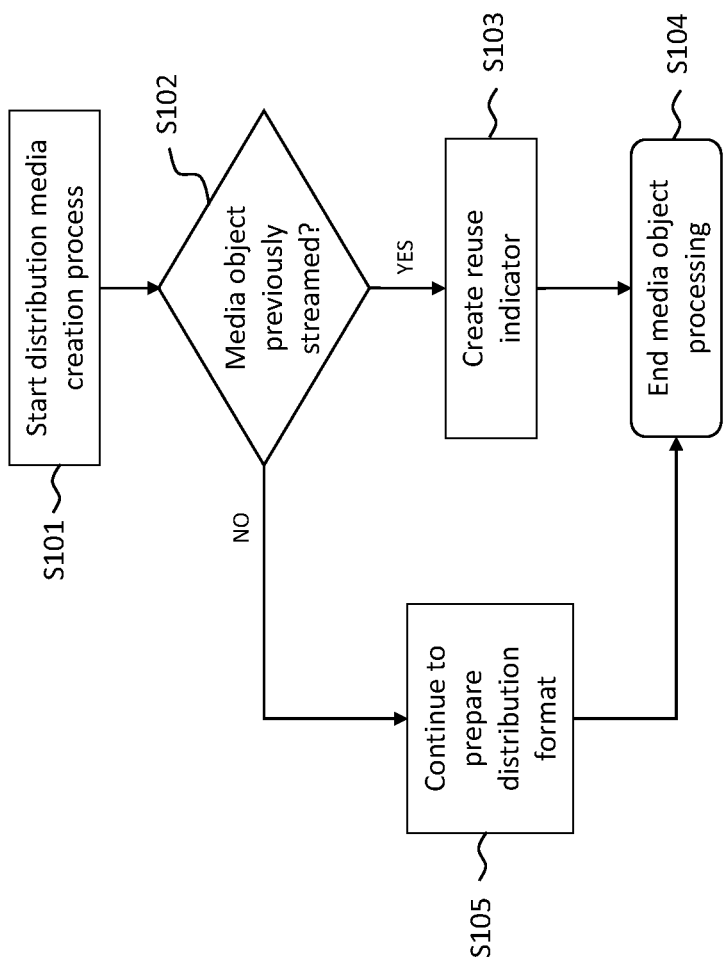
FIG. 1B is a workflow illustrating a reuse logic decision making process.

FIG. 1B is a workflow of the processing module 102, according to embodiments. More specifically, the workflow of FIG. 1B is a reuse logic decision making process that is performed by the optimization reuse logic 121 to aid in the decision making process to determine if a particular media object has already been streamed to the client device 108.

At S101, the distribution media creation process. As such, also beginning the reuse logic decision making process. At S102, conditional logic is performed to determine if a current media object has previously been streamed to the client device 108. The optimization reuse logic 121 may access a list of unique assets for the presentation to determine if the media object has been previously streamed to the client. If the current media object has been previously streamed, the process proceeds to S103. At S103, an indicator (later also referred to as a "proxy") is created to identify that the client has already received the current media object, and should access a copy of the media object from a local cache or other cache. Subsequently, the processing ends for the current media object (S104).

If it is determined that the media object has not been previously streamed, the process proceeds to S105. At S105, processing module 102 continues to prepare the media object for transformation and/or distribution and the distribution format for the media object is created. Subsequently, the proceeds to S104 and the processing ends for the current media object.

Figure 2A:
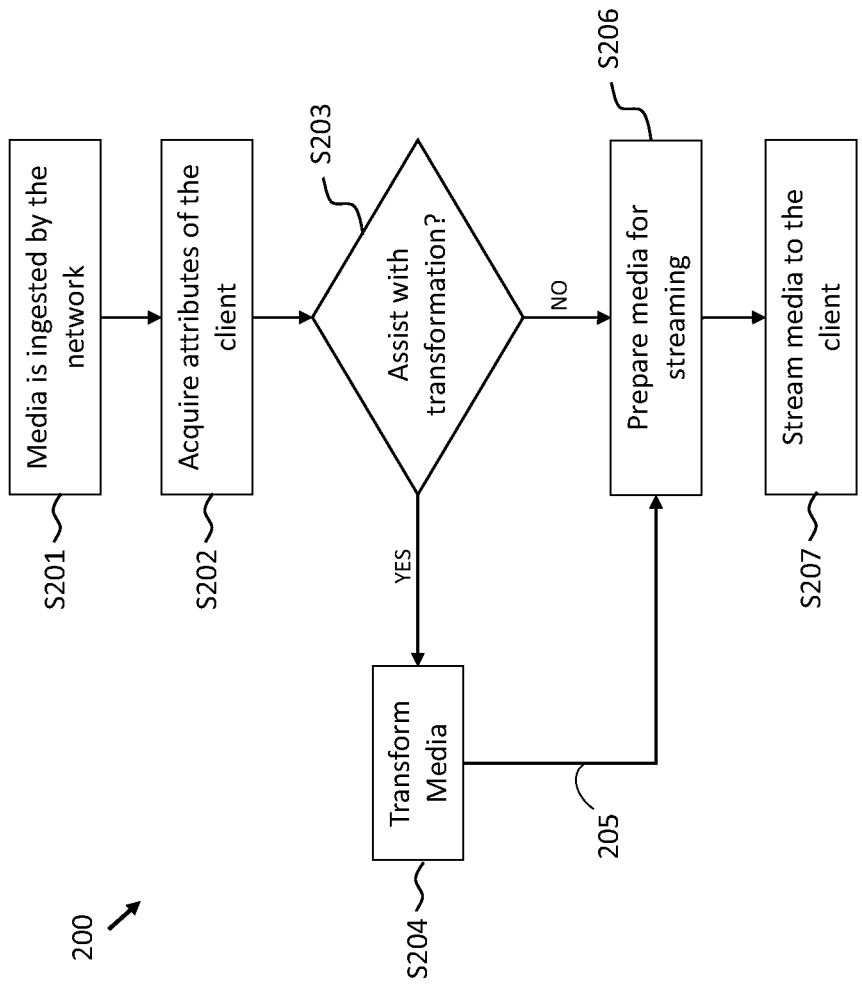
FIG. 2A is a schematic illustration of the flow of media through a network in which a decision making process is employed to determine if the network should transform the media prior to distributing the media to the client, according to embodiments.

FIG. 2A is a logic workflow for processing ingested media through a network. The workflow illustrated in FIG. 2A depicts a media transform decision making process 200, according to embodiments. The media transform decision making process 200 is employed to determine if the network should transform the media prior to distributing the media to a client device. The media transform decision making process 200 may be processed through a manual or an automated process within the network.

Ingest media represented in Format A is provided by a content provider to the network. At S201, the media is ingested by the network from the content provider. Then, at S202, attributes for the targeted client, if not already known, are acquired. The attributes describe the processing capabilities of the targeted client.

At S203, it is determined if the network (or the client) should assist with the transformation of the ingested media. In particular, it is determined if any format conversions for any of the media assets contained within the ingested media (e.g., a conversion of a one or more media objects from Format A to Format B) prior to the media being streamed to the targeted client. The decision making process at S203 may be performed either manually (i.e., by a device operator or the like), or may be an automated process. The decision making process at S203 may be based on a determination of whether the media can be streamed in its original ingested Format A, or if it must be transformed into a different format B to facilitate the presentation of the media by the client. Such a decision may require access to information describing aspects or features of the ingest media, in such a way so as to aid the decision making process to make an optimal choice (i.e., to determine if a transformation of the ingest media is needed prior to streaming the media to the client, or if the media should be streamed in its original ingest Format A directly to the client).

If it is determined that the network (or client) should assist with the transformation of any of the media assets (YES at S203), the process 200 proceeds to S204.

At S204, the ingested media is transformed to convert the media from a Format A into a Format B producing transformed media 205. The transformed media 205 is output and the process proceeds to S206. At S206, the input media undergoes a preparation process for streaming the media to a client. In this case, the transformed media 205 (i.e., the input media) is prepared to be streamed.

Streaming of immersive media, especially where such media is "scene-based" rather than "frame-based" may be relatively nascent. For example, streaming of frame-based media may be equivalent to streaming of frames of video, where each frame captures a full picture of the entire scene or a complete picture of the entire object to be presented by the client. The sequence of frames when reconstructed by the client from their compressed forms, and presented to the viewer, creates a video sequence that comprises the entire immersive presentation or a portion of the presentation. For frame-based streaming, the order in which the frames are streamed from the network to the client may be consistent with a predefined specification (e.g., such as ITU-T Recommendation H.264 Advanced Video Coding for Generic AudioVisual Services). However, scene-based streaming of media is unlike frame-based streaming because the scene may be comprised of individual assets that may be themselves independent of each other. A given scene-based asset may be used multiple times within a particular scene or across a series of scenes. The amount of time that a client, or any given renderer, needs to spend to reconstruct the particular asset may depend on a number of factors including, but not limited to: the size of the asset, the availability of compute resources to perform the rendering, and other attributes that describe the overall complexity of the asset. Clients that support scene-based streaming may require that some or all of the rendering for each of asset within a scene is completed before any of the presentation for the scene can begin. Hence the order in which assets are streamed from a network to the client may impact the overall performance of the system.

The transformations of media from Format A to another format (e.g., Format B) may be done either entirely by the network, entirely by the client, or jointly between both the network and the client. For split rendering, it becomes apparent that a lexicon of attributes that describe a media format may be needed so that both the client and network have complete information to characterize the work that must be done. Furthermore, a lexicon that provides attributes of a client's capabilities, e.g., in terms of available compute resources, available storage resources, and access to bandwidth, may likewise be needed. Even further, a mechanism to characterize the level of compute, storage, or bandwidth complexity of an ingest media format is needed so that the network and client may jointly, or singly, determine if or when the network may employ a split-rendering process for distributing the media to the client.

If it is determined that the network (or client) should not (or does not need to) assist with the transformation of any of the media assets (NO at S203), the process 200 proceeds to S206. At S206, the media is prepared for streaming. In this case, the ingested data (i.e., the media in its original form) is prepared to be streamed.

Finally, once the media data is in a streamable format, the media which has been prepared at S206 is streamed to the client (S207). In some embodiments, (as described with reference to FIG. 1B) if the transformation and or streaming of a particular media object that is or will be needed by the client to complete its presentation of the media may be avoided, then the network may skip transforming and/or streaming of the ingest media (i.e., S204-S207), assuming that the client still has access or availability to the media object that it may need in order to complete the client's presentation of the media. With respect to the order in which scene-based assets are streamed from the network to the client to facilitate the client's ability to perform at its full potential, it may be desireable for a network to be equipped with sufficient information so that the network can determine such an order to improve the performance of the client. For example, such a network that has sufficient information to avoid repetitive transformation and/or streaming steps for assets that are used more than once, in a particular presentation, may perform more optimally than a network that is not designed this way. Likewise, a network that can "intelligently" sequence the delivery of assets to the client may facilitate the client's ability to perform at its full potential (i.e., to create an experience that may be more enjoyable to the end user).

Figure 2B:
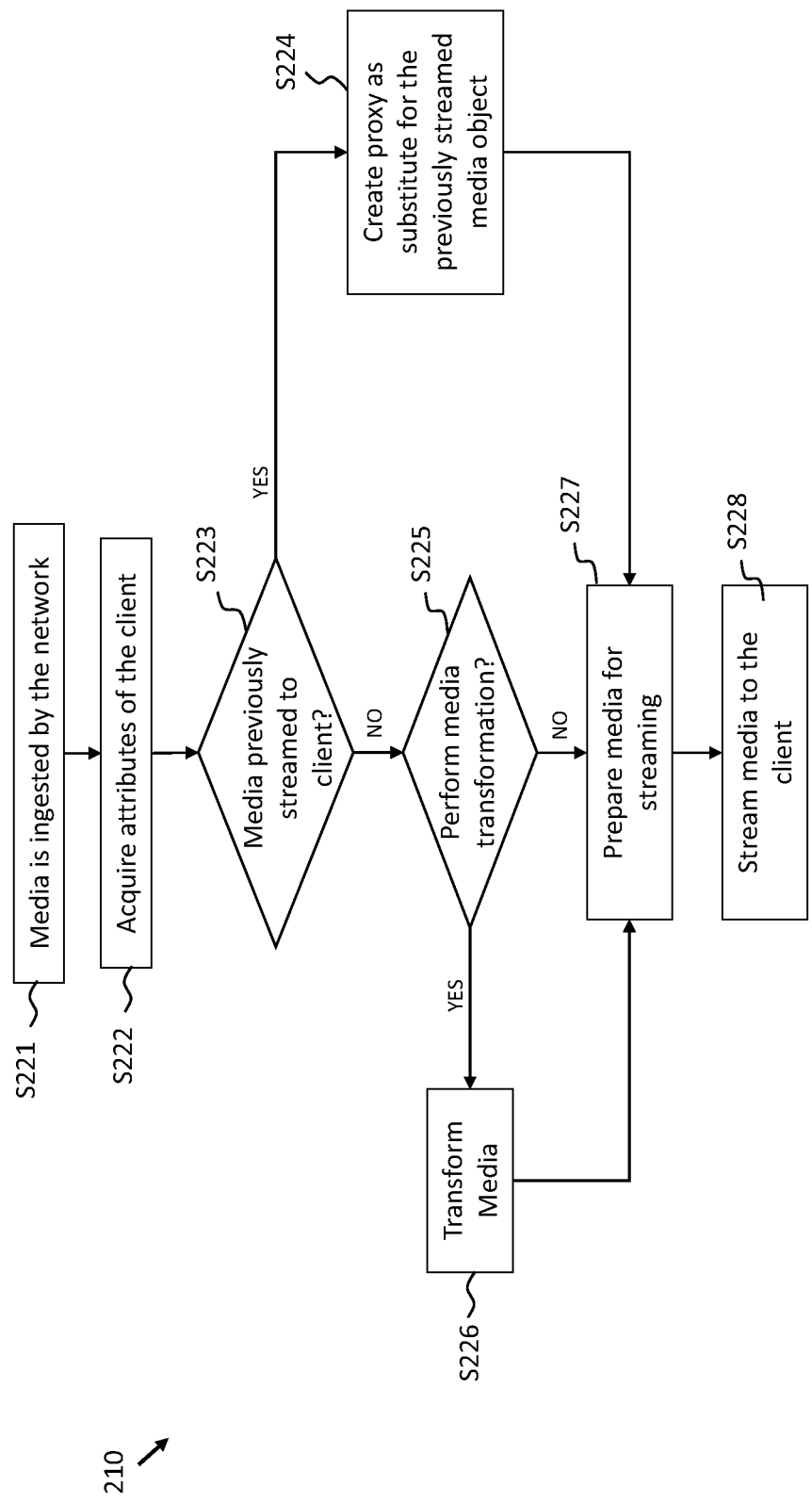
FIG. 2B is a workflow illustrating a media transform decision making process with asset reuse logic, according to embodiments.

FIG. 2B is a media transform decision making process with asset reuse logic 210, according to embodiments. Similar to the media transform decision making process 200, the media transform decision making process with asset reuse logic 210 processes ingest media through a network and employs two decision making processes to determine if the network should transform the media prior to distributing the media to a client.

Ingest media represented in Format A is provided by a content provider to the network. Following, S221-222 are performed and are similar to S201-S202 (shown in FIG. 2A). At S221, the media is ingested by the network from the content provider. Then, at S202, attributes for the targeted client, if not already known, are acquired. The attributes describe the processing capabilities of the targeted client.

If it is determined that the network has previously streamed a particular media object or current media object (YES at S223), the process proceeds to S224. At S224, a proxy is created to substitute for the previously streamed media object to indicate that the client should use its local copy of the previously streamed object.

If it is determine that the network has not previously streamed the particular media object (NO at S223), the process proceeds to S225. At S225, it is determined if the network or the client should perform any format transformations for any of the media assets contained within the ingested media at S221. For example, a transformation may include a conversion of a particular media object from a Format A to a Format B, prior to the media being streamed to the client. Processing performed at S225 may be similar to those performed at SS203 shown in FIG. 2A.

If it is determined media assets should be transformed by the network (YES at S225), the process proceeds to S226. At S226, the media object is transformed from Format A to Format B. The transformed media is then prepared to be streamed to client (S227).

If it is determined media assets should not be transformed by the network (NO at S225), the process proceeds to S227. At S227, the media object is then prepared to be streamed to client.

Finally, once the media data is in a streamable format, the media prepared at S227 is streamed to the client (S228). Processing performed at S225-S228 in FIG. 2B may be similar to those performed at S203-S207 shown in FIG. 2A.

Figure 3A:
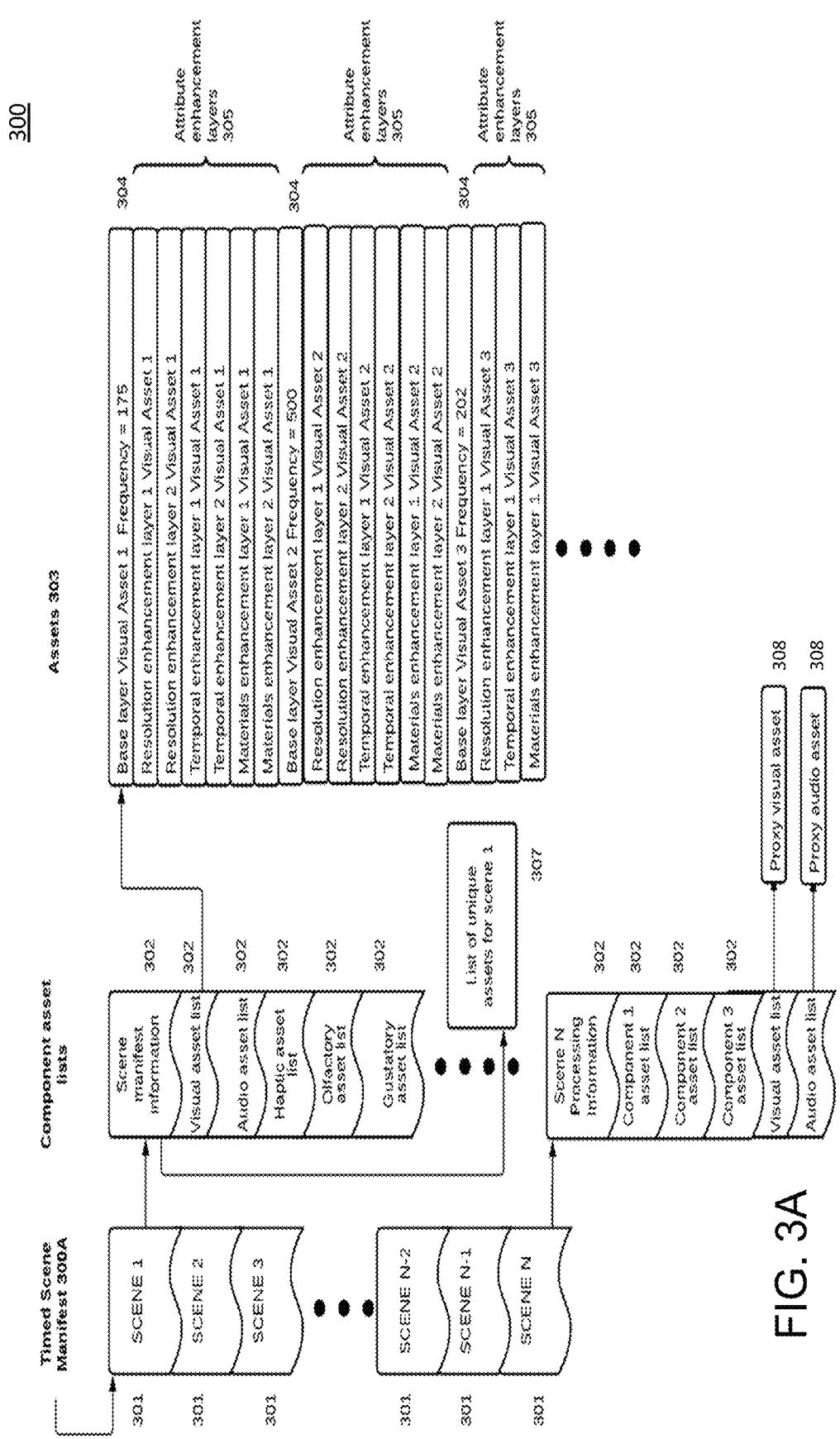
FIG. 3A is a schematic illustration of a data-model for the representation and streaming of timed immersive media, according to embodiments.
Figure 4A:
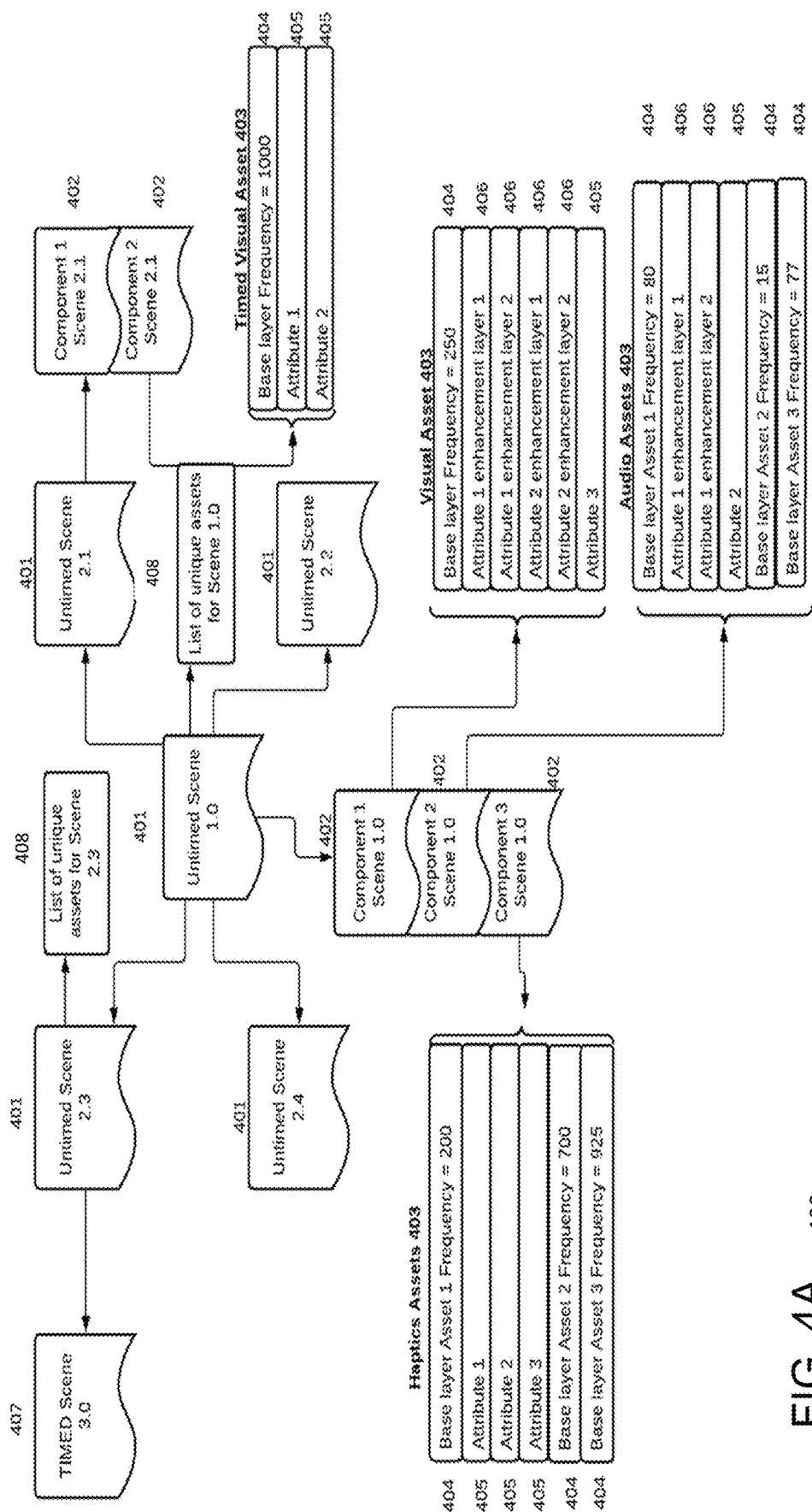
FIG. 4A is a schematic illustration of a data-model for the representation and streaming of untimed immersive media, according to embodiments.

The streamable format of media may be heterogeneous immersive media that is timed or untimed. FIG. 3A illustrates an example of a timed media representation 300 of a streamable format of heterogeneous immersive media. The timed immersive media may include a set of N scenes. Timed media is media content that is ordered by time, e.g., with a start and end time according to a particular clock. FIG. 4 illustrates an example of an untimed media representation 400 of a streamable format of heterogeneous immersive media. Untimed media is media content that is organized by spatial, logical, or temporal relationships (e.g., as in an interactive experience that is realized according to the actions taken by one or more users).

FIG. 3A refers to a timed scene for timed media and FIG. 4 refers to an untimed scene for untimed media. The timed and untimed scenes may be embodied by various scene representations, or scene descriptions. FIGS. 3-4 both employ a single exemplary encompassing media format that has been adapted from a source ingest media format to match the capabilities of a specific client endpoint. That is, the encompassing media format is a distribution format streamable to a client device. The encompassing media format is robust enough in its structure to accommodate a large variety of media attributes where each may be layered based on the amount of salient information that each layer contributes to the presentation of the media.

As shown in FIG. 3A, the timed media representation 300 includes a timed scene manifest 300A that includes a list of scene information 301. The scene information 301 refer to a list of components 302 that separately describe processing information and types of media assets that make up the scene information 301. For example, asset lists and other processing information. The list of components 302 may refer to proxy assets 308 corresponding to the type of asset (e.g., proxy visual and audio assets, as shown in FIG. 3A). The components 302 refer to a list of unique assets that have not been previously used in other scenes. For example, a list of unique assets 307 for a (timed) scene 1 is shown in FIG. 3A. The components 302 also refer to assets 303 that include a base layer 304 and attribute enhancement layers 305. A base layer is a nominal representation of an asset that may be formulated to minimize the compute resources, the time needed to render the asset, and/or the time needed to transmit the asset over a network. In this exemplary embodiment, each of the base layers 304 refer to a numeric frequency metric that indicates the number of times the asset is used across the set of scenes comprising the presentation. Enhancement layers may be a set of information that when applied to the base layer representation of an asset, augment the base layer to include features or capabilities that may not supported in the base layer.

Figure 3B:
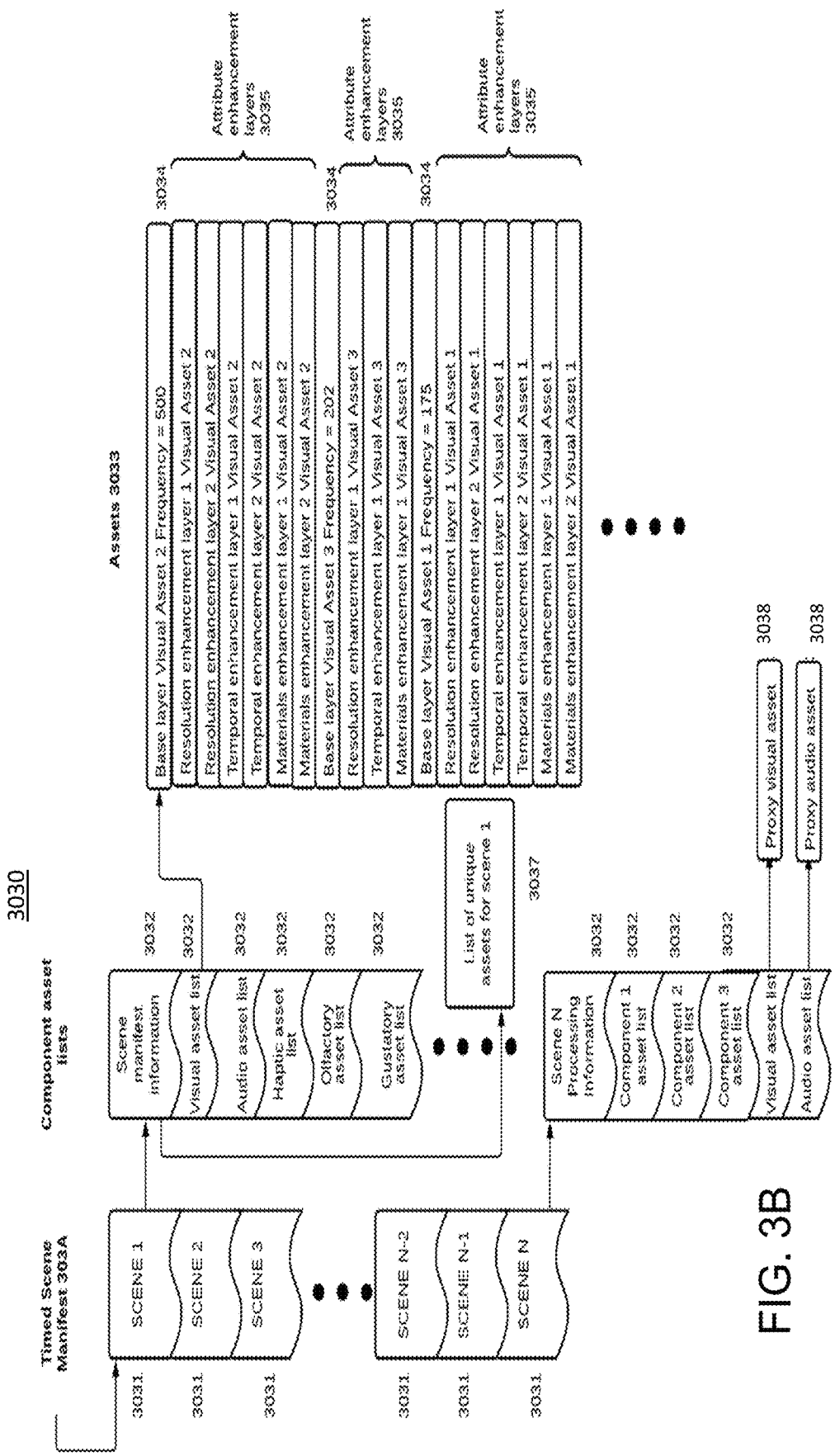
FIG. 3B is a schematic illustration of a data-model for the ordered representation and streaming of timed immersive media, according to embodiments.

FIG. 3B illustrates a timed media representation ordered by descending frequency 3030. This timed media representation is the same representation shown in FIG. 3A, however, the assets 3033 in FIG. 3B are ordered in the list by asset type and descending frequency values within each asset type. The timed scene manifest 303A includes a list of scene information 3031. The list of scene information 3031 refers to a list of components 3032 that separately describe processing information and types of media assets that comprise list of scene information 3031. For example, asset lists and other processing information. The components 3032 may refer to proxy assets 3038 corresponding to the type of asset (e.g., proxy visual and audio assets, as shown in FIG. 3B). The components 3032 refer to assets 3033 that further refer to base layers 3034 and attribute enhancement layers 3035. Each of the base layers 3034 are ordered according to descending values for the corresponding frequency metrics. A list of unique assets 3037 that have not been previously used in other scenes is also provided.

As shown in FIG. 4, the untimed media and complexity representation 400 includes scene information 401. The scene information 401 is not associated with a start and end time/duration (according to a clock, a timer, or the like). An untimed scene manifest (not depicted) may references a Scene 1.0 for which there is no other scene that can branch to Scene 1.0. The scene information 401 refers to a list of components 402 that separately describe processing information and types of media assets that make up the scene information 401. The components 402 refer to visual assets, audio assets, haptic assets, and timed assets (collectively referred to as assets 403). The assets 403 further refer to a base layer 404 and attribute enhancement layers 405 and 406. In this exemplary embodiment, each of the base layer 404 refer to a numeric frequency value that indicates the number of times the asset is used across the set of scenes that comprise the presentation. The scene information 401 may also refer to other untimed scenes (i.e., referenced as untimed scenes 2.1-2.4 in FIG. 4) that are for an untimed media sources and/or scene information 407 that are for a timed media scene (i.e., referenced as timed scene 3.0 in FIG. 4). In the example of FIG. 4, the untimed immersive media contains a set of five scenes (including both timed and untimed). Lists of unique assets 408 identify unique assets associated with a particular scene that have not been previously used in higher order (e.g., parent) scenes. The list of unique assets 408 shown in FIG. 4 include unique assets for an untimed scene 2.3.

Figure 4B:
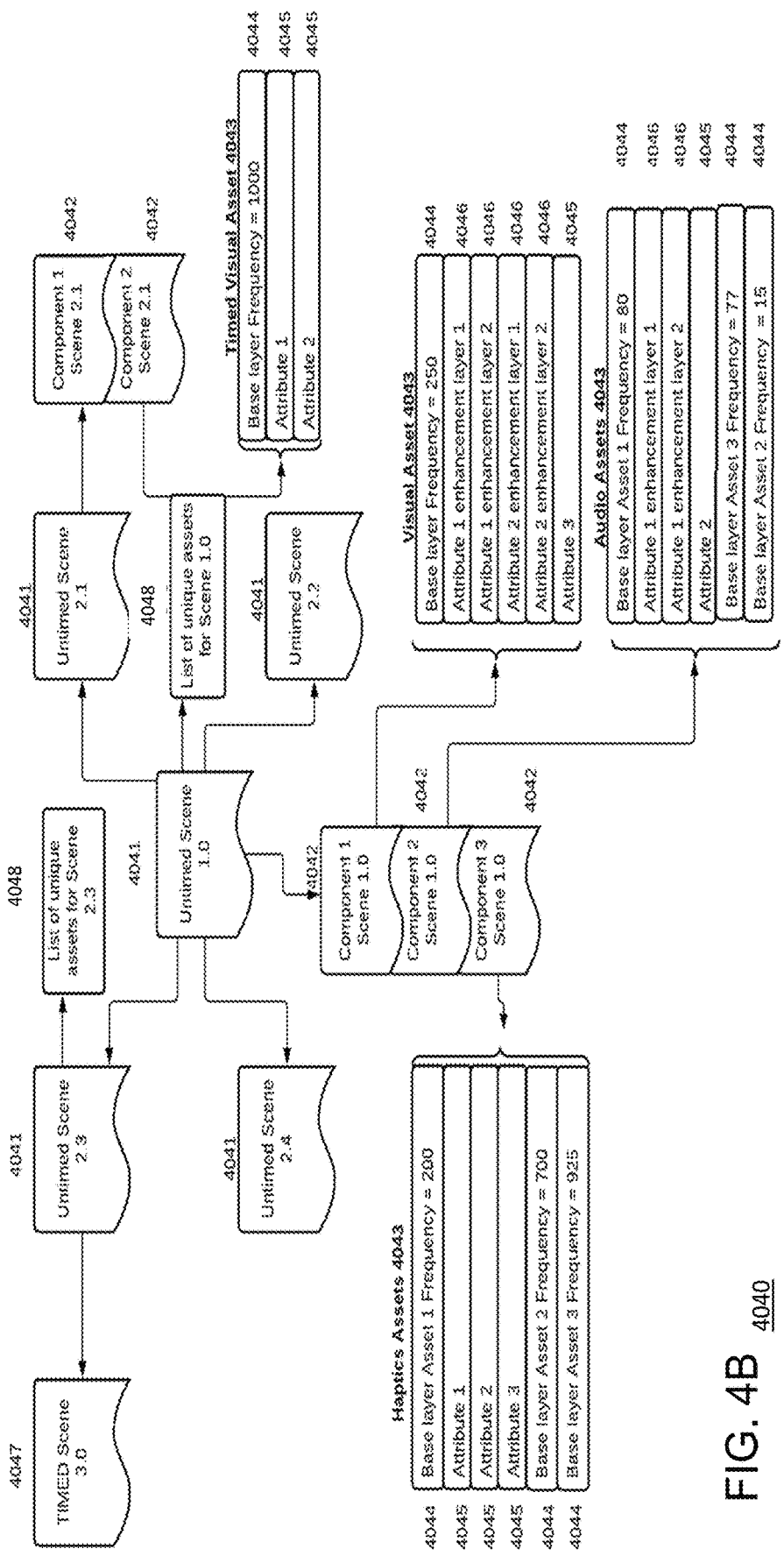
FIG. 4B is a schematic illustration of a data-model for the ordered representation and streaming of untimed immersive media, according to embodiments.

FIG. 4B illustrates an untimed media and ordered complexity representation 4040. An untimed scene manifest (not depicted) references a Scene 1.0 for which there is no other scene that can branch to Scene 1.0. Scene information 4041 is not associated with a start and end duration according to a clock. The scene information 4041 also refers to a list of components 4042 that separately describe processing information and types of media assets that make up scene information 4041. The components 4042 refer to visual assets, audio assets, haptic assets, and timed assets (also collectively referred to as assets 4043). The assets 4043 further refer to base layers 4044 and attribute enhancement layers 4045 and 4046. In this exemplary embodiment, haptic assets 4043 are organized by increasing frequency values, while audio assets 4043 are organized by decreasing frequency values. Furthermore, scenes information 4041 refers to other untimed scenes information 4041 that are for untimed media. The scene information 4041 also refers to other timed scene information 4047 that is for timed media. A lists of unique assets 4048 identify unique assets associated with a particular scene that have not been previously used in higher order (e.g., parent) scenes.

The media that is streamed according to the encompassing media format is not limited to legacy visual and audio media. The encompassing media format may include any type of media information that is capable of producing a signal that interacts with machines to stimulate the human senses for sight, sound, taste, touch, and smell. As shown in FIGS. 3-4, the media that is streamed according to the encompassing media format may be timed or untimed media, or a mixture of both. The encompassing media format is streamable by enabling a layered representation of media objects, using a base layer and enhancement layer architecture.

In some embodiments, the separate base layer and enhancement layers are computed by application of a multi-resolution or multi-tesselation analysis technique for media objects in each scene. This computation technique is not limited to raster-based visual formats.

In some embodiments, a progressive representation of a geometric object may be a multi-resolution representation of the object computed using a wavelet analysis technique.

In some embodiments, in the layered representation media format, the enhancement layers may apply different attributes to the base layer. For example, one or more of the enhancement layers may refine material properties of a surface of a visual object that is represented by the base layer.

In some embodiments, in the layered representation media format, the attributes may refine the texture of the surface of the object that is represented by the base layer by, e.g., changing the surface from a smooth to a porous texture, or from a matted surface to a glossy surface.

In some embodiments, in the layered representation media format, the surfaces of one or more visual objects in the scene may be altered from a lambertian surface to being a ray-traceable surface.

In some embodiments, in the layered representation media format, the network may distribute the base-layer representation to the client so that the client may create a nominal presentation of the scene while the client awaits the transmission of additional enhancement layers to refine the resolution or other characteristics of the base layer.

In embodiments, the resolution of the attributes or refining information in the enhancement layers are not explicitly coupled with the resolution of the object in the base layer. Further, the encompassing media format may support any type of information media that may be presented or actuated by a presentation device or machine, thereby enabling the support of heterogeneous media formats to heterogeneous client endpoints. In some embodiments, the network that distributes the media format will first query the client endpoint to determine the client's capabilities. Based on the query, if the client is not capable of meaningfully ingesting the media representation, then the network may remove the layers of attributes that are not supported by the client. In some embodiments, if the client is not capable of meaningfully ingesting the media representation, the network may adapt the media from its current format into a format that is suitable for the client endpoint. For example, the network may adapt the media by converting a volumetric visual media asset into a 2D representation of the same visual asset using a network-based media processing protocol. In some embodiments, the network may adapt the media by employing a neural network (NN) process to reformat the media to an appropriate format or optionally synthesize views that are needed by the client endpoint.

The manifest of scenes for a complete (or partially complete) immersive experience (live streaming event, game, or playback of on-demand asset) is organized by scenes which contain a minimal amount of information required for rendering and ingesting in order to create a presentation. The manifest of scenes includes a list of individual scenes that are to be rendered for the entirety of the immersive experience requested by the client. Associated with each scene are one or more representations of the geometric objects within the scene corresponding to the streamable versions of the scene geometry. One embodiment of a scene may refers to a low resolution version of the geometric objects for the scene. Another embodiment of the same scene may refer to an enhancement layer for the low resolution representation of the scene to add additional detail, or increase tessellation, of the geometric objects of the same scene. As described above, each scene may have one or more enhancement layers to increase the detail of the geometric objects of the scene in a progressive manner. Each layer of the media objects that are referenced within a scene may be associated with a token (e.g., a uniform resource identifier (URI)) that points to the address of where the resource can be accessed within the network. Such resources are analogous to content delivery networks (CDN) where the content may be fetched by the client. The token for a representation of a geometric object may point to a location within the network or to a location within the client. That is, the client may signal to the network that its resources are available to the network for network-based media processing.

According to embodiments, a scene (timed or untimed) may be embodied by a scene graph as a Multi-Plane Image (MPI) or as a Multi-Spherical Image (MSI). Both the MPI and MSI techniques are examples of technologies that aid in the creation of display-agnostic scene representations for natural content (i.e., images of the real world captured simultaneously from one or more cameras). Scene graph technologies, on the other hand, may be employed to represent both natural and computer-generated imagery in the form of synthetic representations. However, such representations are especially compute-intensive to create for cases where the content is captured as natural scenes by one or more cameras. Scene graph representations of naturally-captured content are both time and computation intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are impractical to consider as candidates for representing natural content because they cannot practically be created in real-time for consideration of use cases that require real-time distribution. As such, the best representations for computer generated imagery is to employ the use of a scene graph with synthetic models, because computer generated imagery is created using 3D modeling processes and tools, employing the use of a scene graph with synthetic models results in the best representations for computer generated imagery.

Figure 5:
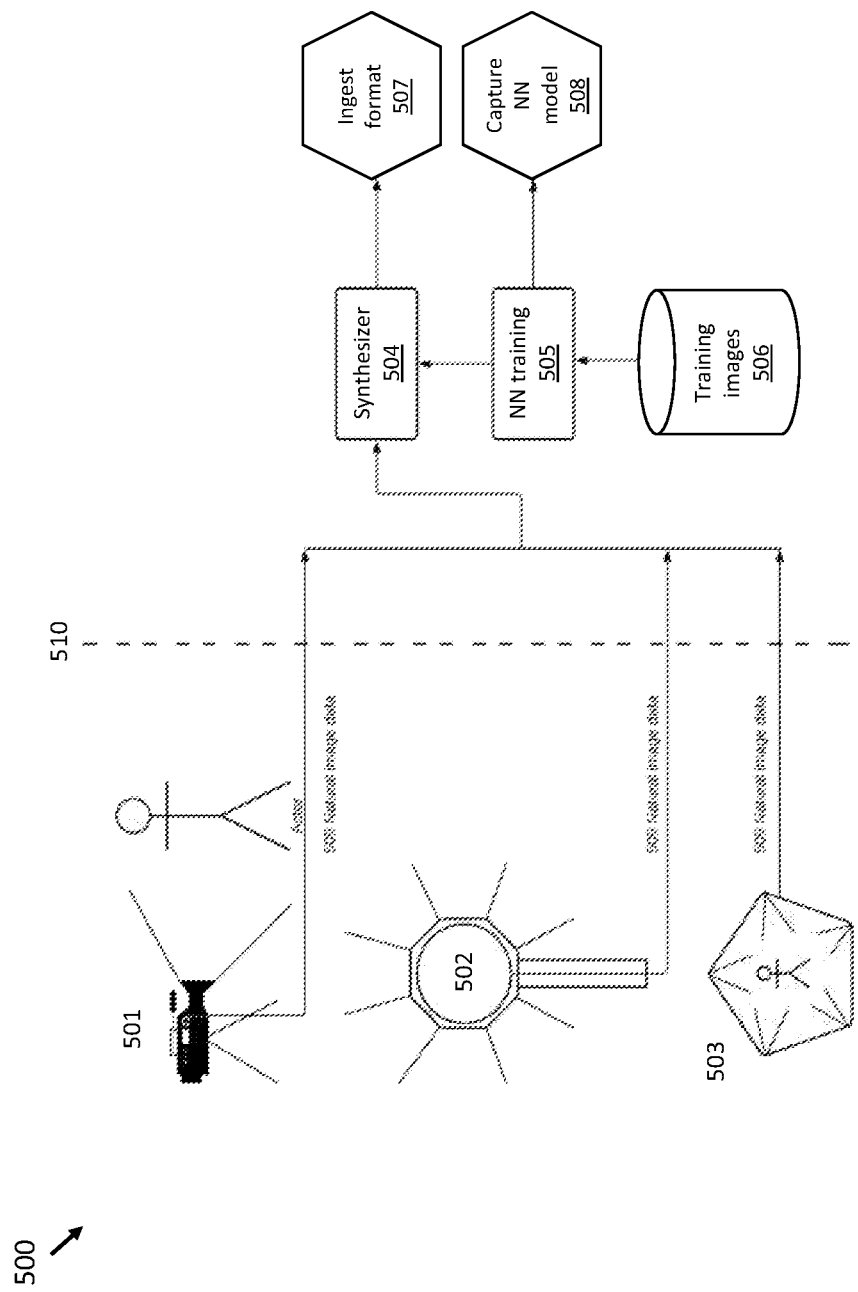
FIG. 5 is a schematic illustration of a natural media synthesis process, according to embodiments.

FIG. 5 illustrates an example of a natural media synthesis process 500, according to embodiments. The natural media synthesis process 500 converts an ingest format from a natural scene to a representation that can be used as an ingest format for a network that serves heterogeneous client endpoints. The left side of the dashed line 510 is the content capturing portion of the natural media synthesis process 500. The right side of the dashed line 510 is the ingest format synthesis (for natural images) of the natural media synthesis process 500.

As shown in FIG. 5, a first camera 501 uses a single camera lens to capture a scene of, for example, a person (i.e., the actor shown in FIG. 5). A second camera 502 captures a scene with five diverging fields of view by mounting five camera lenses around a ring-shaped object. The arrangement of the second camera 502 shown in FIG. 5 is an exemplary arrangement commonly used to capture omnidirectional content for VR applications. A third camera 503 captures a scene with seven converging fields of view by mounting seven camera lenses on the inner diameter portion of a sphere. The arrangement of the third camera 503 is an exemplary arrangement commonly used to capture light fields for light field or holographic immersive displays. Embodiments are not limited to configurations shown in FIG. 5. The second camera 502 and the third camera 503 may include a plurality of camera lenses.

Natural image content 509 is output from the first camera 501, the second camera 502, and the third camera 503 and serve as input to a synthesizer 504. The synthesizer 504 may employ a NN training 505 using a collection of training images 506 to produce a capture NN model 508. The training images 506 may be pre-defined or stored from a previous synthesis processing. A NN model (for example, the capture NN model 508) is a collection of parameters and tensors (e.g., matrices) that define weights (i.e., numerical values) used in well-defined mathematical operations applied to a visual signal to arrive at an improved visual output which may include the interpolation of new views for the visual signal that were not explicitly provided by the original signal.

In some embodiments, a photogrammetry process may be implemented in lieu of the NN training 505. If the capture NN model 508 is created during the natural media synthesis process 500, then the capture NN model 508 becomes one of the assets in the ingest format 507 for the natural media content. The ingest format 507 may be, for example, a MPI or a MSI. The ingest format 507 may also include media assets.

Figure 6:
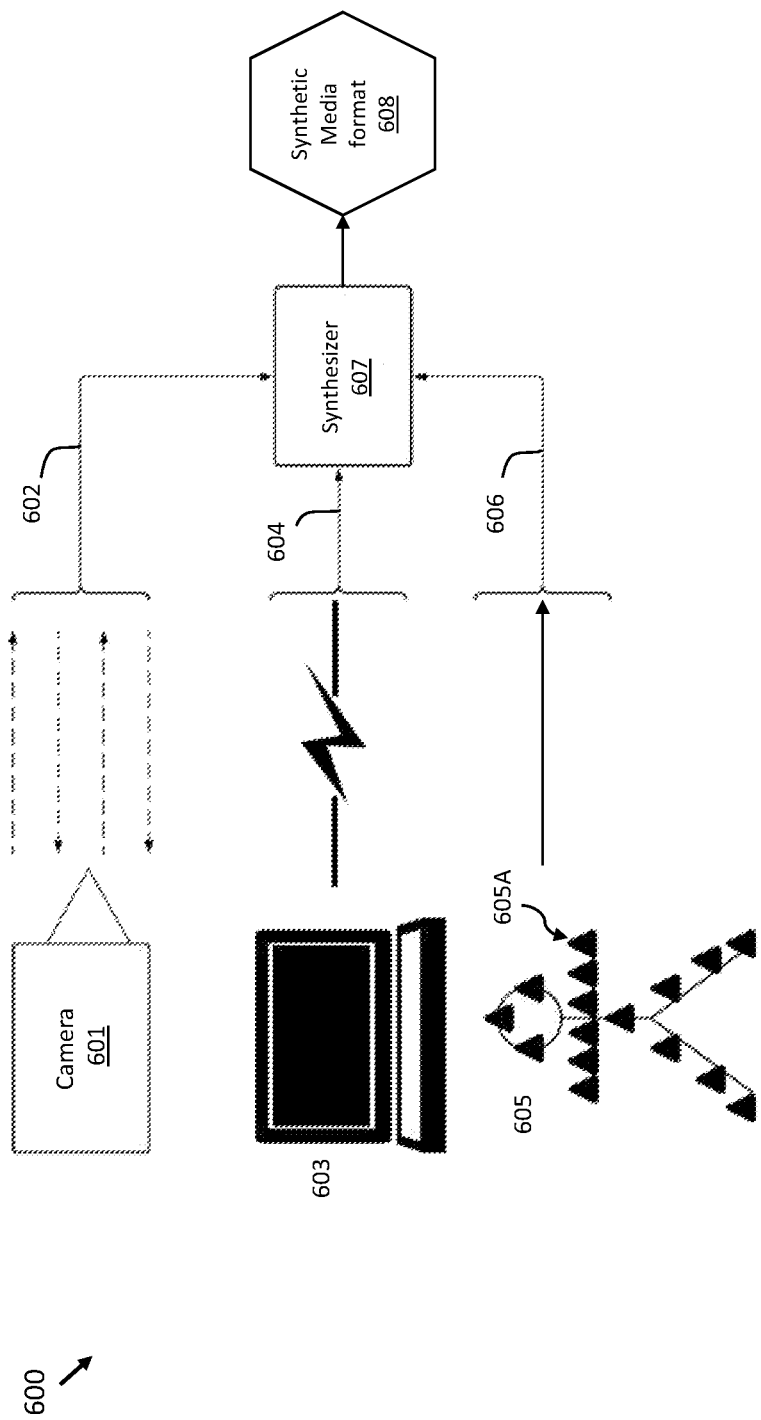
FIG. 6 is a schematic illustration of an example of a synthetic media ingest creation process, according to embodiments.

FIG. 6 illustrates an example of a synthetic media ingest creation process 600, according to embodiments. The synthetic media ingest creation process 600 creates an ingest media format for synthetic media such as, e.g., computer-generated imagery.

As shown in FIG. 6, a camera 601 may capture point clouds 602 of a scene. The camera 601 may be, for example, a LIDAR camera. A computer 603 employs, for example, common gateway interface (CGI) tools, 3D modelling tools, or another animation processes to create synthetic content (i.e., a representation of a synthetic scene that can be used as an ingest format for a network that serves heterogeneous client endpoints). The computer 603 may create CGI assets 604 over a network. Additionally, sensors 605A may be worn on an actor 605 in a scene. The sensors 605A may be, for example, a motion capture suit with sensors attached. The sensors 605A capture a digital recording of the motion of the actor 605 to produce animated motion data 606 (or MoCap Data). The data from the point clouds 602, the CGI assets 604, and the motion data 606 are provided as input to synthesizer 607 which creates the synthetic media ingest format 608. In some embodiments, the synthesizer 607 may use a NN and training data to create a NN model to generate the synthetic media ingest format 608.

Both natural and computer generated (i.e., synthetic) content may be stored in a container. The container may include a serialized format to store and exchange information to represent all natural, all synthetic, or a mixture of synthetic and natural scenes including a scene graph and all of the media resources that are required for rendering of the scene. The serialization process of the content includes translating data structures or an object state into a format that can be stored (e.g., in a file or a memory buffer) or transmitted (e.g., across a network connection link) and reconstructed later in a same or different computer environment. When the resulting series of bits is reread according to the serialization format, it can be used to create a semantically identical clone of the original object.

The dichotomy in optimal representations of both natural and computer generated (i.e., synthetic) content suggests that the optimal ingest format for naturally-captured content is different from the optimal ingest format for computer generated content or for natural content that is not essential for real-time distribution applications. Therefore, according to embodiments, the network targets to be robust enough to support multiple ingest formats for visually immersive media, whether they are created naturally through the use of, e.g., physical cameras or by a computer.

Technologies such as ORBX by OTOY, Universal Scene Description by Pixar, and Graphics Language Transmission Format 2.0 (glTF2.0) specification written by the Khronos 3D Group embody scene graphs as a format suitable for representing visual immersive media that is created using computer generated techniques, or naturally captured content for which deep learning or photogrammetry techniques are employed to create the corresponding synthetic representations of a natural scene (i.e., not essential for real-time distribution applications).

ORBX by OTOY is one of several scene graph technologies that is able to support any type of visual media, timed or untimed, including ray-traceable, legacy (frame-based), volumetric, and other types of synthetic or vector-based visual formats. ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for Open Shader Language, a robust camera system, and support for Lua Scripts. ORBX is also the basis of the Immersive Technologies Media Format published for license under royalty-free terms by the Immersive Digital Experiences Alliance (IDEA). In the context of real time distribution of media, the ability to create and distribute an ORBX representation of a natural scene is a function of the availability of compute resources to perform a complex analysis of the camera-captured data and synthesis of the same data into synthetic representations.

USD by Pixar is a scene graph that is popularly used in visual effects and professional content production. USD is integrated into the Nvidia's Omniverse platform which is a set of tools for developers for 3D model creation and rendering with Nvidia's graphic processing units (GPU). A subset of USD, published by Apple and Pixar, is referred to as USDZ which is supported by Apple's ARKit.

The glTF2.0 is a version of the Graphics Language Transmission Format specification written by the Khronos 3D Group. This format supports a simple scene graph format that is generally capable of supporting static (untimed) objects in scenes, including PNG and JPEG image formats. The glTF2.0 supports simple animations, including support for translate, rotate, and scale of basic shapes described using the glTF primitives (i.e., for geometric objects). The glTF2.0 does not support timed media, and hence does not support video nor audio media inputs.

These designs for scene representations of immersive visual media are provided for example only, and do not limit the disclosed subject matter in its ability to specify a process to adapt an input immersive media source into a format that is suitable to the specific characteristics of a client endpoint device. Moreover, any or all of the above example media representations either employ or may employ deep learning techniques to train and create a NN model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques. The view may also be directly rendered from render engines based on specific virtual camera locations, filters, or descriptions of virtual cameras for these render engines.

The methods and devices of the present disclosure are robust enough to consider that there is a relatively small but well known set of immersive media ingest formats that are sufficiently capable of satisfying requirements for real-time or on-demand (e.g., non-real-time) distribution of media that is either captured naturally (e.g., with one or more cameras) or created using computer generated techniques.

Interpolation of views from an immersive media ingest format by use of either NN models or network-based rendering engines are further facilitated as advanced network technologies (e.g., 5G for mobile networks), and fiber optical cables are deployed for fixed networks. These advanced network technologies increase the capacity and capabilities of commercial networks because such advanced network infrastructures can support transport and delivery of increasingly larger amounts of visual information. Network infrastructure management technologies such as Multi-access Edge Computing (MEC), Software Defined Networks (SDN), and Network Functions Virtualization (NFV) enable commercial network service providers to flexibly configure their network infrastructure to adapt to changes in demand for certain network resources, e.g., to respond to dynamic increases or decreases in demand for network throughputs, network speeds, roundtrip latency, and computational resources. Moreover, this inherent ability to adapt to dynamic network requirements likewise facilitates the ability of networks to adapt immersive media ingest formats to suitable distribution formats in order to support a variety of immersive media applications with potentially heterogeneous visual media formats for heterogeneous client endpoints.

Immersive Media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client endpoint display that is consuming the data. In general, any consumer-facing application may be supported by a variety of client endpoints with various onboard-client capabilities for storage, compute, and power, and likewise various requirements for particular media representations.

Therefore, embodiments of the present disclosure enable a sufficiently equipped network, i.e., a network that employs some or all of the characteristics of a modern network, to simultaneously support a plurality of legacy and immersive media-capable devices according to features that are specified within the device. As such, the immersive media distribution methods and processes described herein provide flexibility to leverage media ingest formats that are practical for both real-time and on demand use cases for the distribution of media, flexibility to support both natural and computer generated content for both legacy and immersive-media capable client endpoints, and support for both timed and untimed media. The methods and processes also dynamically adapt a source media ingest format to a suitable distribution format based on the features and capabilities of the client endpoint, as well as based on the requirements of the application. This ensure that the distribution format is streamable over IP-based networks and enables the network to simultaneously serve a plurality of heterogeneous client endpoints that may include both legacy and immersive media-capable devices. Further, embodiments provide an exemplary media representation framework that facilitates the organization of distribution media along scene boundaries.

An end-to-end implementation of the heterogeneous immersive media distribution according to embodiments of the present disclosure, providing the aforementioned improvements, are achieved according to the processing and components described in the detailed description of FIGS. 3-16, further detailed below.

Figure 7:
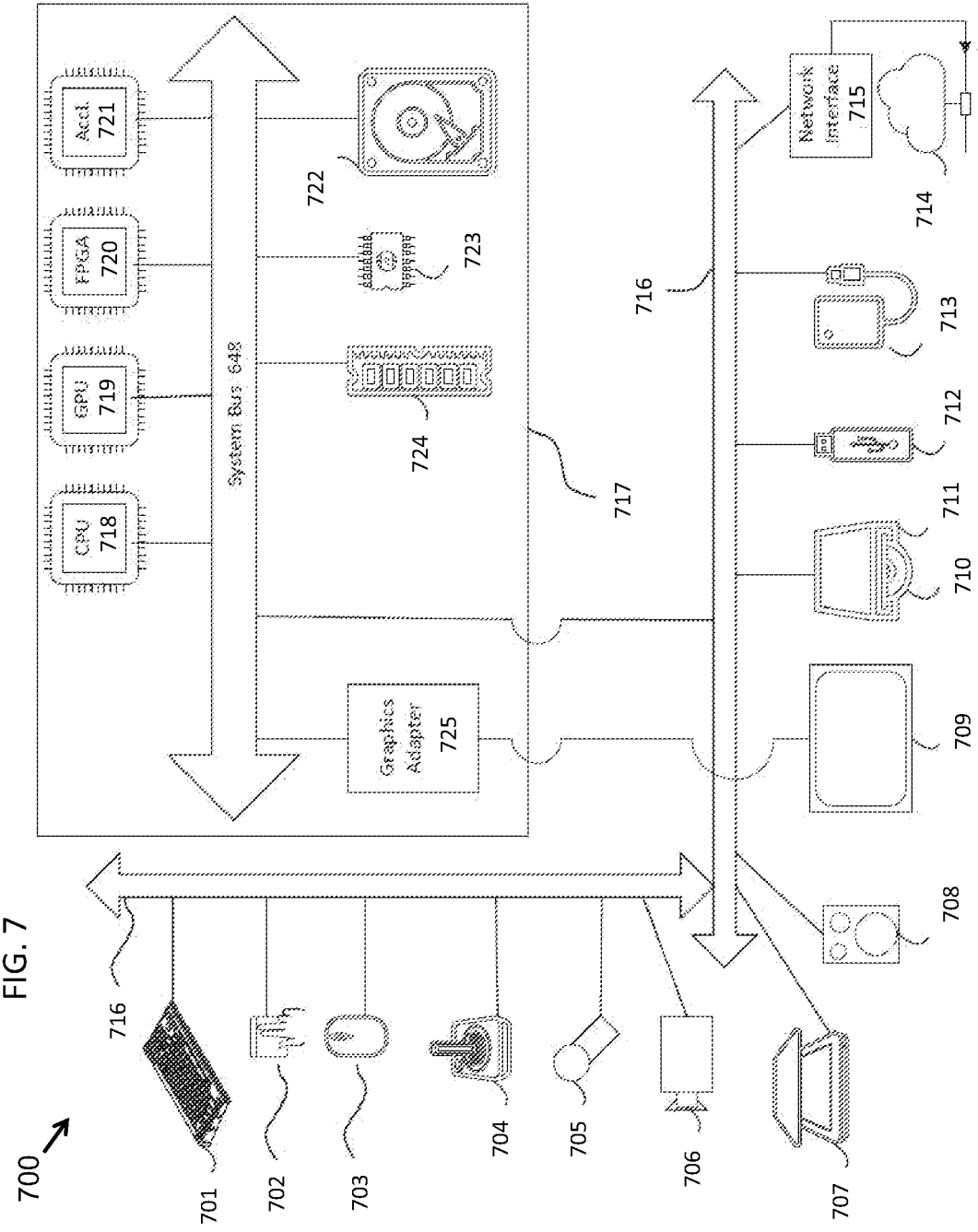
FIG. 7 is a schematic illustration of a computer system, according to embodiments.

The techniques for representing and streaming heterogeneous immersive media, described above, may be implemented in both sources and destinations as computer software using computer-readable instructions and physically stored in one or more non-transitory computer-readable media or by a specifically configured one or more hardware processors. FIG. 7 shows a computer system 700 suitable for implementing certain embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as keystrokes, swipes, data glove movements), audio input (such as voice, clapping), visual input (such as gestures), olfactory input. The human interface devices may also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 701, trackpad 702, mouse 703, screen 709, which may be for example a touch-screen, data-glove, joystick 704, microphone 705, camera 706, and scanner 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the screen 709, data-glove, or joystick 704, but there may also be tactile feedback devices that do not serve as input devices), audio output devices (such as: speakers 708, headphones), visual output devices (such as screens 709 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses, holographic displays and smoke tanks), and printers.

Computer system 700 may also include human accessible storage devices and their associated media such as optical media including CD/DVD ROM/RW 711 with CD/DVD or the like media 710, thumb-drive 712, removable hard drive or solid-state drive 713, legacy magnetic media such as tape and floppy disc, specialized ROM/ASIC/PLD based devices such as security dongles, and the like.

Those skilled in the art should also understand that term "computer-readable media" as used in connection with the presently disclosed subject matter does not encompass transmission media, carrier waves, or other transitory signals.

Computer system 700 may also include an interface 715 to one or more communication networks 714. Networks 714 may, for example, be wireless, wireline, optical. Networks 714 may further be local, wide-area, metropolitan, vehicular and industrial, real-time, delay-tolerant, and so on. Examples of networks 714 include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks 714 commonly require external network interface adapters (e.g., graphics adapter 725) that attached to certain general-purpose data ports or peripheral buses 716 (such as, for example, USB ports of the computer system 700; others are commonly integrated into the core of the computer system 700 by attachment to a system bus as described below (for example Ethernet interface into a PC computer system or cellular network interface into a smartphone computer system). Using any of these networks 714, computer system 700 may communicate with other entities. Such communication may be uni-directional, receive only (for example, broadcast TV), uni-directional send-only (for example, CANbus to certain CANbus devices), or bi-directional, for example to other computer systems using local or wide area digital networks. Certain protocols and protocol stacks may be used on each of those networks and network interfaces, as described above.

The aforementioned human interface devices, human-accessible storage devices, and network interfaces may be attached to a core 717 of the computer system 700.

The core 717 may include one or more Central Processing Units (CPU) 718, Graphics Processing Units (GPU) 719, specialized programmable processing units in the form of Field Programmable Gate Areas (FPGA) 720, hardware accelerators 721 for certain tasks, and so forth. These devices, along with Read-only memory (ROM) 723, Random-access memory (RAM) 724, internal mass storage such as internal non-user accessible hard drives, SSDs, and the like 722, may be connected through a system bus 726. In some computer systems, the system bus 726 may be accessible in the form of one or more physical plugs to enable extensions by additional CPUs, GPU, and the like. The peripheral devices may be attached either directly to the core's system bus 726, or through a peripheral bus 716. Architectures for a peripheral bus include PCI, USB, and the like.

CPUs 718, GPUs 719, FPGAs 720, and accelerators 721 may execute certain instructions that, in combination, may make up the aforementioned machine code (or computer code). That computer code may be stored in ROM 723 or RAM 724. Transitional data may also be stored in RAM 724, whereas permanent data may be stored, for example, in the internal mass storage 722. Fast storage and retrieval to any of the memory devices may be enabled through the use of cache memory, which may be closely associated with one or more CPU 718, GPU 719, mass storage 722, ROM 723, RAM 724 and the like.

The computer-readable media may have computer code thereon for performing various computer-implemented operations. The media and computer code may be specially designed and constructed for the purposes of the present disclosure, or they may be of the kind well known and available to those having skill in the computer software arts.

As an example and not by way of limitation, a computer system having the architecture of computer system 700, and specifically the core 717 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 717 that are of non-transitory nature, such as core-internal mass storage 722 or ROM 723. The software implementing various embodiments of the present disclosure may be stored in such devices and executed by core 717. A computer-readable medium may include one or more memory devices or chips, according to particular needs. The software may cause the core 717 and specifically the processors therein (including CPU, GPU, FPGA, and the like) to execute particular processes or particular parts of particular processes described herein, including defining data structures stored in RAM 724 and modifying such data structures according to the processes defined by the software. In addition or as an alternative, the computer system may provide functionality as a result of logic hardwired or otherwise embodied in a circuit (for example, accelerator 721), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

The number and arrangement of components shown in FIG. 7 are provided as an example. In practice, the input human interface devices may include additional components, fewer components, different components, or differently arranged components than those shown in FIG. 7. Additionally, or alternatively, a set of components (e.g., one or more components) of the input human interface devices may perform one or more functions described as being performed by another set of components of the input human interface devices.

In embodiments, any one of the operations or processes of FIGS. 1-6 and FIGS. 8-15 may be implemented by or using any one of the elements illustrated in FIG. 7.

Figure 8:
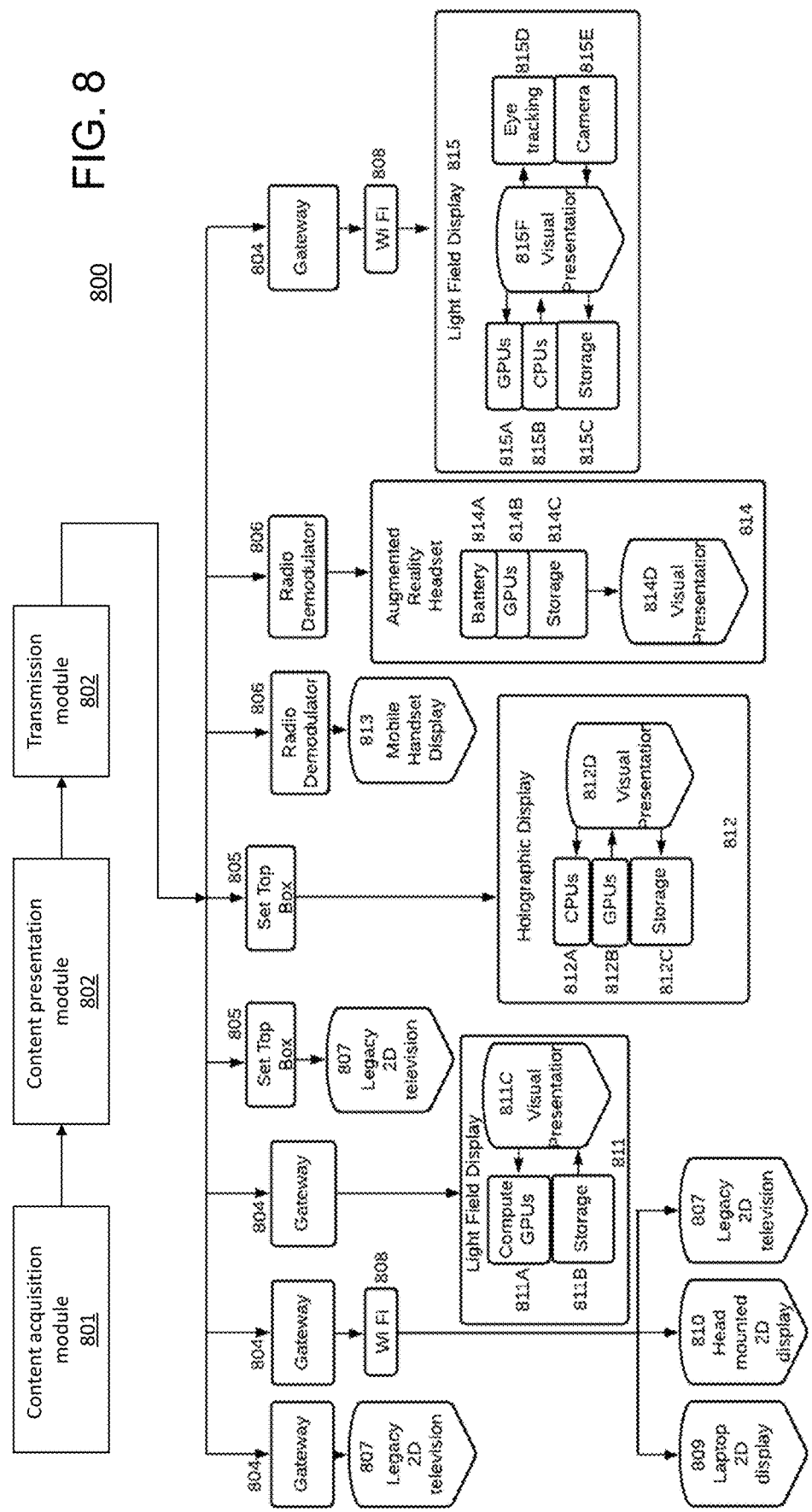
FIG. 8 is a schematic illustration of a network media distribution system, according to embodiments.

FIG. 8 illustrates an exemplary network media distribution system 800 that serves a plurality of heterogeneous client endpoints. That is, the system 800 supports a variety of legacy and heterogeneous immersive-media capable displays as client endpoints. The system 800 may include a content acquisition module 801, a content preparation module 802, and a transmission module 803.

The content acquisition module 801 captures or creates source media using, for example, embodiments described in FIG. 6 and/or FIG. 5. The content preparation module 802 creates ingest formats which are then transmitted to a network media distribution system using the transmission module 803. Gateways 804 may serve customer premise equipment to provide network access to various client endpoints for the network. Set top boxes 805 may also serve as customer premise equipment to provide access to aggregated content by the network service provider. Radio demodulators 806 may serve as mobile network access points for mobile devices, e.g., as shown with mobile handset display 813. In this particular embodiment of system 800, Legacy 2D Televisions 807 are shown to be directly connected to one of the gateways 804, Set Top Box 805, or WiFi (router) 808. A laptop 2D display 809 (i.e., a computer or laptop with a legacy 2D display) is illustrated as a client endpoint connected to WiFi (router) 808. A head mounted 2D (raster-based) display 810 is also connected to the WiFi (router) 808. A lenticular light field display 811 is shown connected to one of the gateways 804. The lenticular light field display 811 may include one or more GPUs 811A, a storage device 811B, and a visual presentation component 811C that creates multiple views using a ray-based lenticular optical technology. A holographic display 812 is shown connected to a set top box 805. The holographic display 812 may include one or more CPUs 812A, GPUs 812B, a storage device 812C, and a visualization component 812D. The visualization component 812D may be a Fresnel pattern, wave based holographic device/display. An augmented reality (AR) headset 814 is shown connected to the radio demodulator 806. The AR headset 814 may include a GPU 814A, a storage device 814B, a battery 814C, and a volumetric visual presentation component 814D. A dense light field display 815 is shown as connected to a WiFi (router) 808. The dense light field display 815 may include one or more GPUs 815A, CPUs 815B, storage device 815C, an eye tracking device 815D, camera 815E, and a dense ray-based light field panel 815F.

The number and arrangement of components shown in FIG. 8 are provided as an example. In practice, the system 800 may include additional components, fewer components, different components, or differently arranged components than those shown in FIG. 8. Additionally, or alternatively, a set of components (e.g., one or more components) of the system 800 may perform one or more functions described as being performed by another set of components of the device or respective displays.

Figure 9:
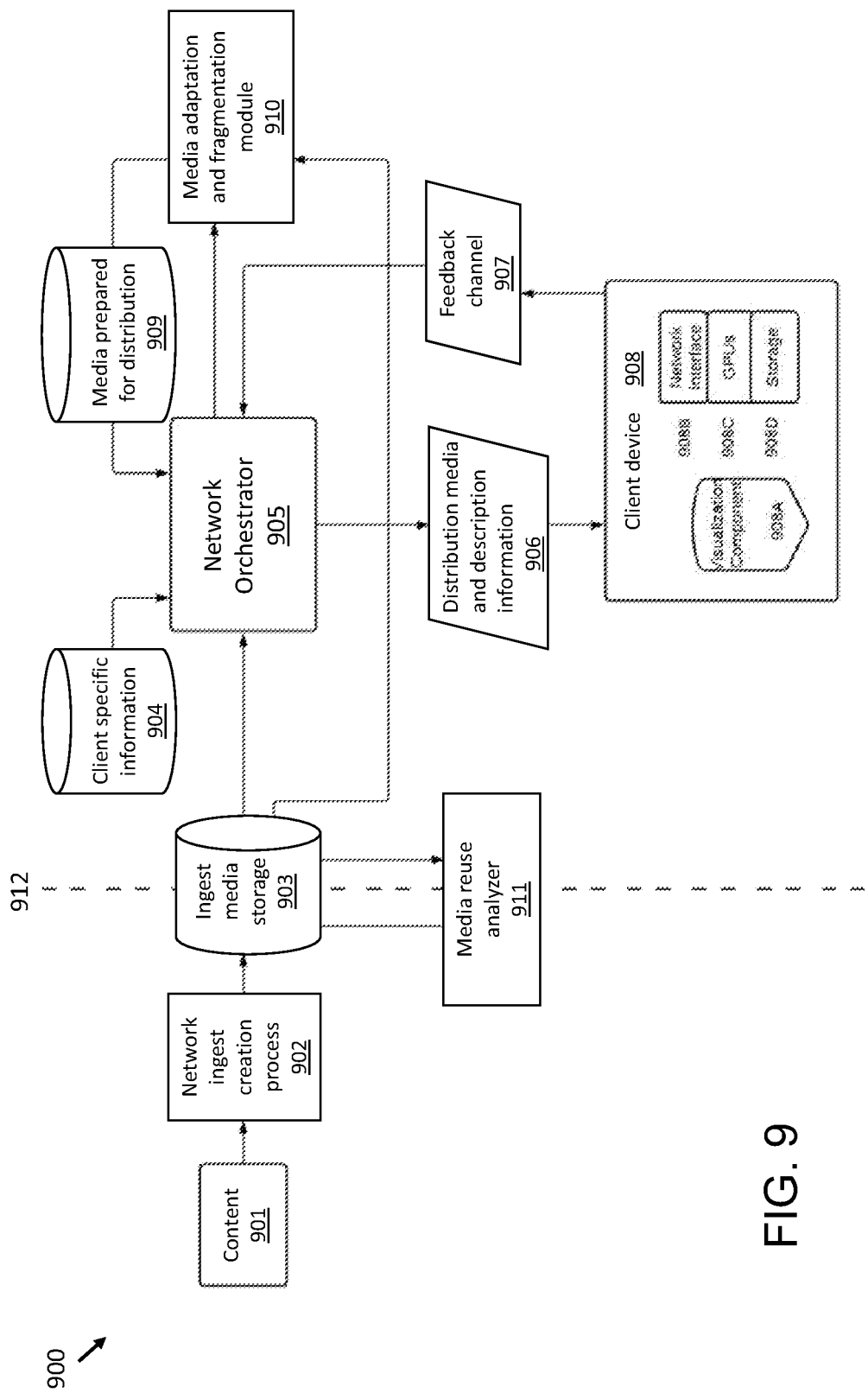
FIG. 9 is a schematic illustration of an exemplary workflow of an immersive media distribution process, according to embodiments.

FIG. 9 illustrates an exemplary workflow of an immersive media distribution process 900 that is capable of serving legacy and heterogeneous immersive media-capable displays as previously depicted in FIG. 8. The immersive media distribution process 900, performed by a network, may provide adaptation information about the specific media represented in the media ingest format, e.g., prior to the network's process of adapting the media for consumption (as described with reference to FIG. 10) by a specific immersive media client endpoint.

The immersive media distribution process 900 may be broken up into two parts: immersive media production on the left side of the dashed line 912 and immersive media network distribution on the right side of the dashed line 912. The immersive media production and immersive media network distribution may be performed by the network or the client device.

First, media content 901 is either created or acquired by the network (or client device) or from a content source, respectively. Methods for creating or acquiring data are, e.g., embodied in FIG. 5 and FIG. 6 for natural and synthetic content, respectively. The created content 901 is then converted into an ingest format using a network ingest format creation process 902. The network ingest creation process 902 is also embodied in FIG. 5 and FIG. 6 for natural and synthetic content, respectively. The ingest format may also be updated to store information regarding assets that are potentially reused across multiple scenes from, for example, a media reuse analyzer 911 (detailed later with reference to FIG. 10 and FIG. 14A). The ingest format is transmitted to the network and stored in a ingest media storage 903 (i.e., a storage device). In some embodiments, the storage device may be in the immersive media content producer's network, and accessed remotely for the immersive media network distribution 920. Client and application specific information is optionally available in a remote storage device, client specific information 904. In some embodiments, the client specific information 904 may exist remotely in an alternate cloud network, and may be transmitted to the network.

A network orchestrator 905 is then performed. The network orchestration serves as the primary source and sink of information to execute major tasks of the network. The network orchestrator 905 may be implemented in unified format with other components of the network. The network orchestrator 905 may be a process that further employ a bi-directional message protocol with the client device to facilitate all processing and distribution of the media in accordance with the characteristics of the client device. Furthermore, the bi-directional protocol may be implemented across different delivery channels (e.g., a control plane channel and/or a data plane channel).

As shown in FIG. 9, the network orchestrator 905 receives information about the features and attributes of a client device 908. The network orchestrator 905 collects requirements regarding the application currently running on the client device 908. This information may be obtained from the client specific information 904. In some embodiments, the information may be obtained by directly querying the client device 908. When the client device is directly queried, a bi-directional protocol is assumed to be present and operational so that the client device 908 may communicate directly to with the network orchestrator 905.

Figure 10:
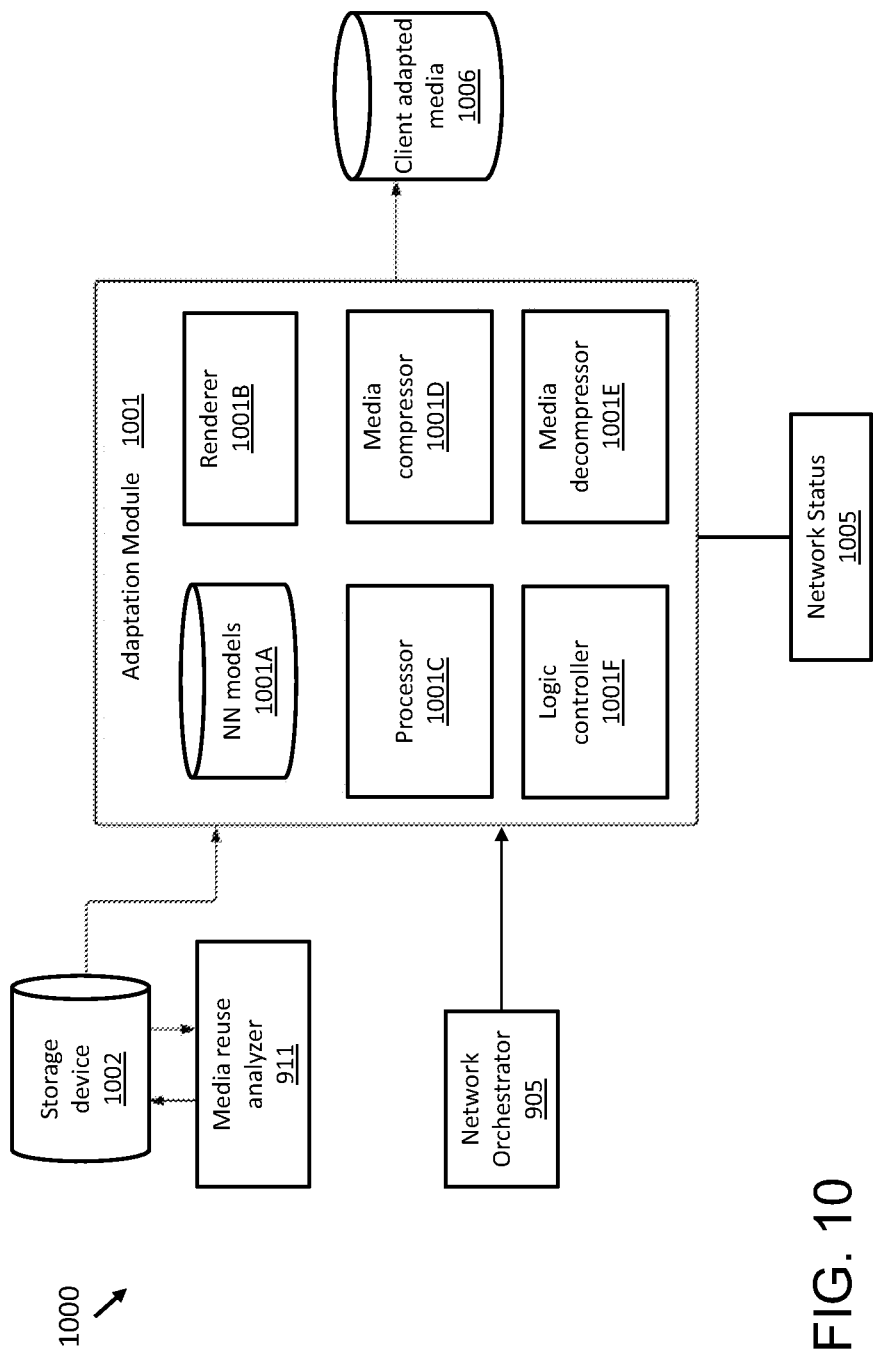
FIG. 10 is a system diagram of a media adaptation process system, according to embodiments.

The network orchestrator 905 may also initiates and communicates with a media adaptation and fragmentation module 910 (which is described in FIG. 10). As ingest media is adapted and fragmented by the media adaptation and fragmentation module 910, the media may be transferred to an intermedia storage device such as a media prepared for distribution 909. As the distribution media is prepared and stored in media prepared for distribution 909 storage device, the network orchestrator 905 ensures that the client device 908 either receives the distribution media and descriptive information 906 either through a "push" request, or the client device 908 may initiate a "pull" request of the distribution media and descriptive information 906 from the stored media prepared for distribution 909. The information may be "pushed" or "pulled" via a network interface 908B of the client device 908. The "pushed" or "pulled" distribution media and descriptive information 906 may be description information that corresponds to the distribution media.

In some embodiments, the network orchestrator 905 employs a bi-directional message interface to perform the "push" request or to initiate a "pull" request by the client device 908. The client device 908 may optionally employ GPUs 908C (or CPUs).

The distribution media format is then stored in storage device or storage cache 908D included in the client device 908. Finally, the client device 908 visually presents the media via a visualization component 908A.

Throughout the process of streaming the immersive media to the client device 908, the network orchestrator 905 monitors the status of the client's progress via a client progress and status feedback channel 907. In some embodiments, the monitoring of the status may be performed through a bi-directional communication message interface.

FIG. 10 illustrates an example of a media adaptation process 1000 performed by, e.g., the media adaptation and fragmentation module 910. By performing the media adaptation process 1000, the ingested source media may be appropriately adapted to match the requirements of the client (e.g., the client device 908).

As shown in FIG. 10, the media adaptation process 1000 includes multiple components that facilitate the adaptation of the ingest media into an appropriate distribution format for the client device 908. The components illustrated in FIG. 10 should be regarded as exemplary. In practice, the media adaptation process 1000 may include additional components, fewer components, different components, or differently arranged components than those shown in FIG. 10. Additionally, or alternatively, a set of components (e.g., one or more components) of the media adaptation process 1000 may perform one or more functions described as being performed by another set of components.

In FIG. 10, an adaptation module 1001 receives input a network status 1005 to track the current traffic load on the network. As mentioned, the adaptation module 1001 also receives information from the network orchestrator 905. The information may include attributes and features descriptions of the client device 908, application features and descriptions, the current status of the application, and a client NN model (if available) to aid in mapping the geometry of the client's frustum to the interpolation capabilities of the ingest immersive media. Such information may be obtained by means of a bi-directional message interface. The adaptation module 1001 ensures that the adapted output, as it is created, is stored into a storage device for storing client-adapted media 1006.

A media reuse analyzer 911 may be an optional process that may be executed a priori or as part of the network automated process for the distribution of the media. The media reuse analyzer 911 may store the ingest media format and assets in a storage device (1002). The ingest media format and assets may then be transmitted to the adaptation module 1001 from the storage device (1002).

The adaptation module 1001 may be controlled by a logic controller 1001F. The adaptation module 1001 may also employ a renderer 1001B or a processor 1001C to adapt the specific ingest source media to a format that is suitable for the client. The processor 1001C may be NN-based processor. The processor 1001C uses NN Models 1001A. Examples of such a processor 1001C include the Deepview NN model generator as described in MPI and MSI. If the media is in a 2D format, but the client must have a 3D format, then the processor 1001C may invoke a process to use highly correlated images from a 2D video signal to derive a volumetric representation of the scene depicted in the media.

The renderer 1001B may be a software-based (or hardware-based) application or process, based on a selective mixture of disciplines related to: acoustic physics, light physics, visual perception, audio perception, mathematics, and software development, that, given an input scene graph and asset container, emits a (typically) visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container and used in a series of rendering processes in a graphics pipeline). For audio-based media assets, a renderer may emit an audio signal for presentation in a multi-channel loudspeaker and/or bi-nauralized headphones, or for repackaging into another (output) container. Renderers include, for example, real-time rendering features of source and cross-platform game engines. A renderer may include scripting language (i.e., an interpreted programming language) that may be executed by the renderer at runtime to process dynamic input and variable state changes made to the scene graph nodes. The dynamic input and variable state changes may affect rendering and evaluation of spatial and temporal object topology (including physical forces, constraints, inverse kinematics, deformation, collisions), and energy propagation and transport (light, sound). Evaluation of the spatial and temporal object topology produces a result (e.g., similar to evaluation of a document object model for a webpage) that causes the output to move from an abstract to a concrete result.

The renderer 1001B may be, for example, a modified version of the OTOY Octane renderer which would be modified to interact directly with the adaptation module 1001. In some embodiments, the renderer 1001B implements a computer graphics method (e.g., path tracing) of rendering three-dimensional scenes such that the illumination of the scene is faithful to reality. in some embodiments, the renderer 1001B may employ a shader (i.e., a type of computer program that was originally used for shading (the production of appropriate levels of light, darkness, and color within an image), but which now performs a variety of specialized functions in various fields of computer graphics special effects, video post-processing unrelated to shading, and other functions unrelated to graphics).

The adaptation module 1001 may perform compression and decompression of the media content using a media compressor 1001D and media decompressor 1001E, respectively, depending on the need for compression and decompression based on the format of the ingest media and the format required by the client device 908. The media compressor 1001D may be a media encoder and the media decompressor 1001E may be a media decoder. After performing the compression and decompression (if necessary), the adaptation module 1001 outputs client adapted media 1006 which is optimal for streaming or distribution to the client device 908. The client adapted media 1006 may be stored in a storage device for storing the adapted media.

FIG. 11 illustrates an exemplary distribution format creation process 1100. As shown in FIG. 11, the distribution format creation process 1100 includes an adapted media packaging module 1103 that packages media output from the media adaptation process 1000 and stored as the client adapted media 1006. The media packaging module 1103 formats the adapted media from the client adapted media 1006 into a robust distribution format 1104. The distribution format may be, for example, the exemplary formats shown in FIG. 3 or FIG. 4. An information manifest 1104A may provide the client device 908 with a list of scene data assets 1104B. The list of scene data assets 1104B may also include metadata describing the frequency by each asset is used across the set of scenes comprising the presentation. The list of scene data assets 1104B depicts a list of visual assets, audio assets, and haptic assets, each with their corresponding metadata. In this exemplary embodiment, each of the assets in list of scene data assets 1104B references metadata that contains a numeric frequency value that indicates the number of times that a particular asset is used across all scenes that comprise the presentation.

Figure 11A:
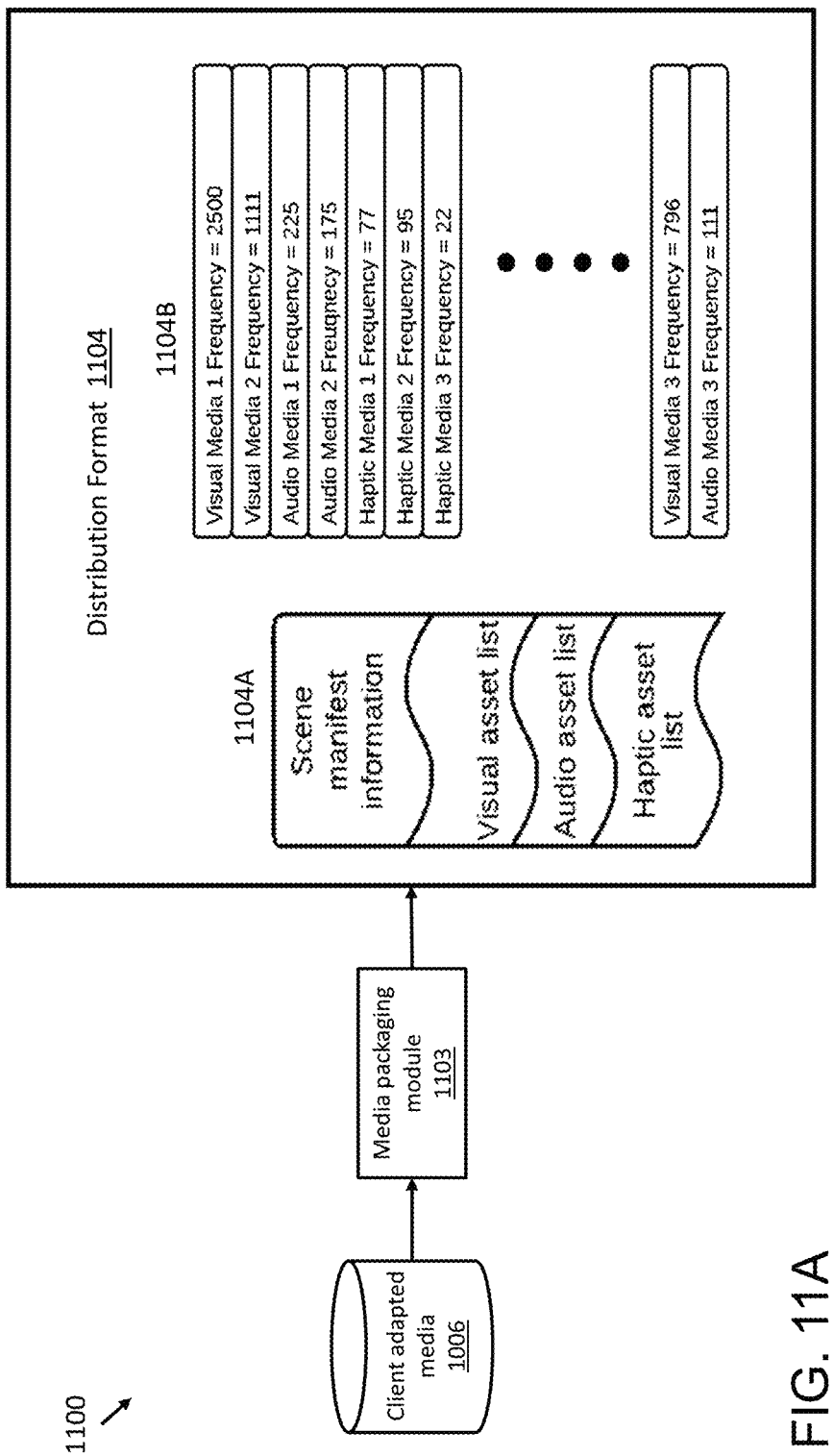
FIG. 11A is a schematic illustration of an exemplary distribution format creation process, according to embodiments.
Figure 11B:
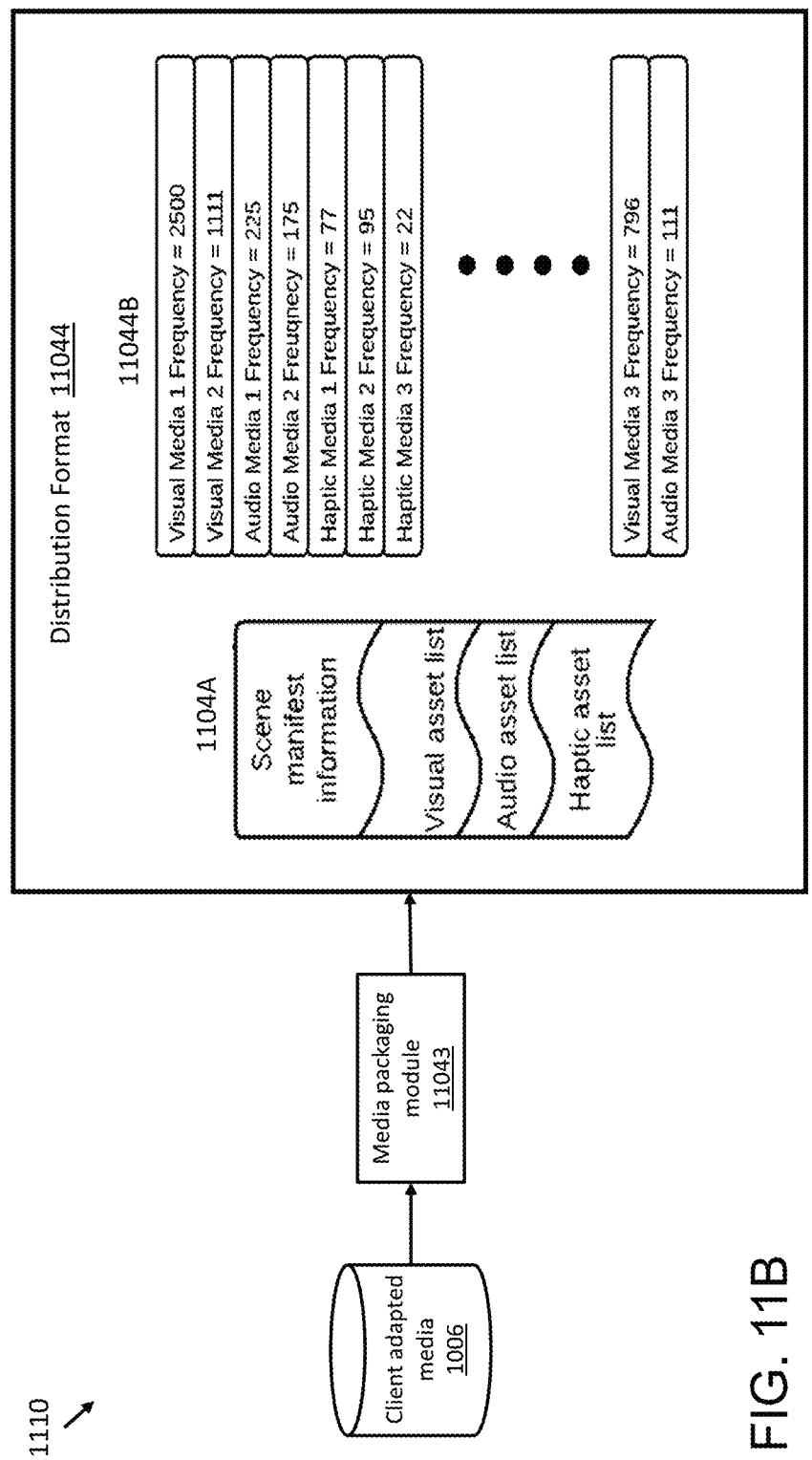
FIG. 11B is a schematic illustration of an exemplary distribution format creation process with frequency and asset type ordering, according to embodiments.

FIG. 11B depicts a distribution format creation with ordered frequency process 1110. The distribution format creation with ordered frequency process 1110 includes components similar to that of FIG. 11A. As such, repeated descriptions are emitted herein with reference to FIG. 11B. The media packaging module 11043 is similar to the media packaging module 1103. However, the media packaging module 11043 orders the assets in a list of scene data assets 11044B based on frequency. For example, the visual assets in list of scene data assets 11044B may be ordered by increasing frequency, while audio and haptic assets in list of scene data assets 1104B may be ordered by decreasing frequency. As shown in FIG. 11B, the assets in the distribution format 11044 are ordered first by asset type and then by the frequency by which the assets are used across the entire presentation, e.g., in either ascending or descending frequency values based on asset type (i.e., visual, haptic, audio, etc.). The information manifest 11044A provides the client device 908 with the list of scene data assets 11044B that it can expect to receive as well as optional metadata indicating the frequency by which all assets are used across the set of scenes comprising the entire presentation. The list of scene data assets 1104B includes a list of visual assets, audio assets, and haptic assets, each with their corresponding metadata.

The media may further be packetized before steaming. FIG. 12 illustrates an exemplary packetizing process 1200. The packetizing system 1200 includes, a packetizer 1202. The packetizer 1202 may receive the list of scene data assets 1104B (or 11044B) as input media 1201 (as shown in FIG. 12). In some embodiments, the client adapted media 1006 or the distribution format 1104 are input to the packetizer 1202. The packetizer 1202 separates the input media 1201 into individual packets 1203 suitable for representation and streaming to the client device 908 on the network.

Figure 13:
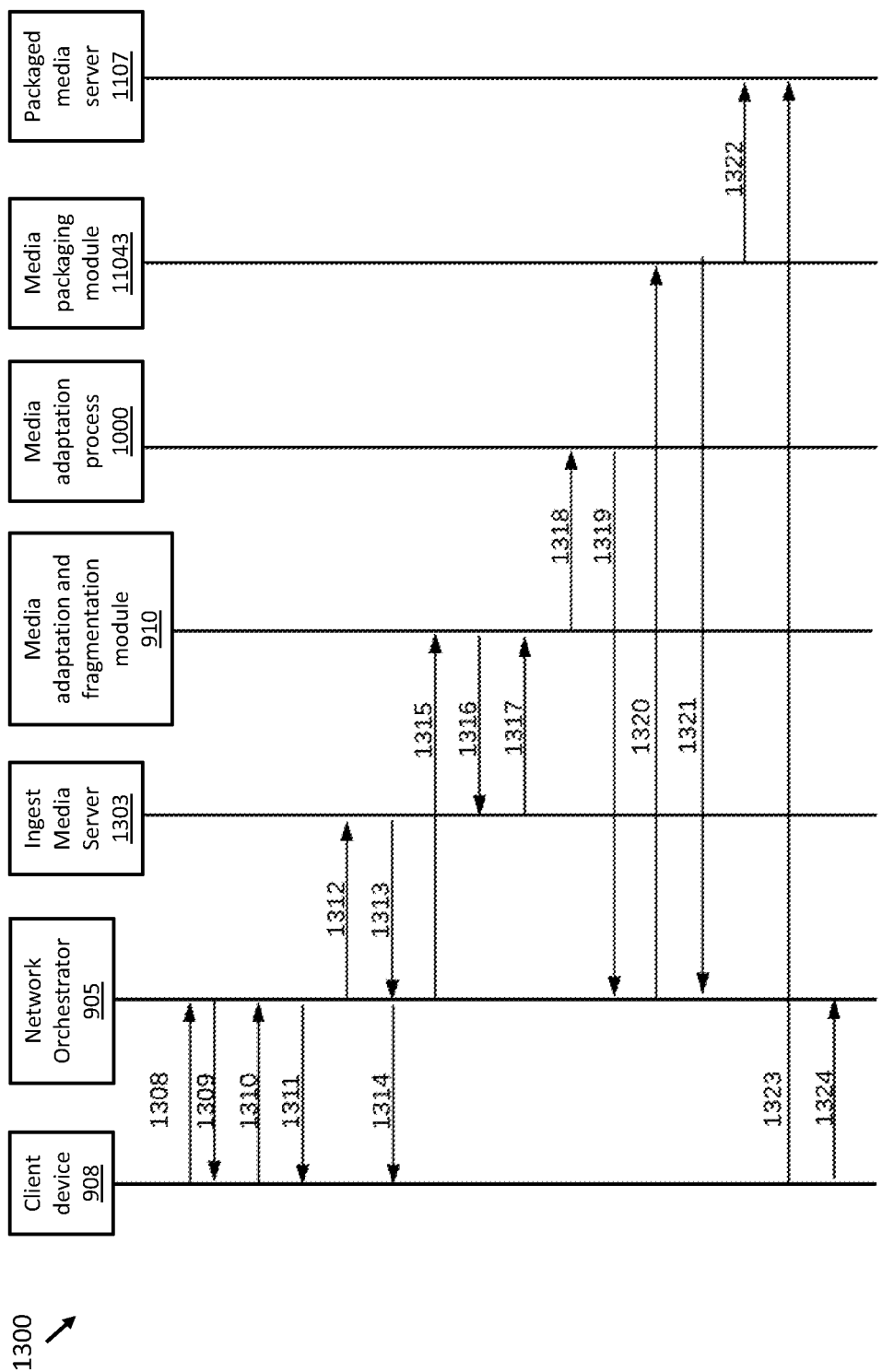
FIG. 13 is a sequence diagram illustrating an example of communication flow between components, according to embodiments.

FIG. 13 is a sequence diagram illustrating an example of data and communication flow between components in accordance with embodiments. The sequence diagram of FIG. 13 is of a network adapting a specific immersive media in an ingest format to a streamable and suitable distribution format for a specific immersive media client endpoint. The data and communication flow is as follows.

The client device 908 initiates a media request 1308 to the network orchestrator 905. In some embodiments, the request may be made to a network distribution interface of the client device. The media request 1308 includes information to identify the media that is requested by the client device 908. The media request may be identified by, e.g., a uniform resource name (URN) or another standard nomenclature.

The network orchestrator 905 then responds to the media request 1308 with profile requests 1309. The profile requests 1309 request that the client provide information about currently available resources (including compute, storage, percent battery charged, and other information to characterize the current operating status of the client). The profile requests 1309 also request that the client provide one or more NN models that may be used by the network for NN inferencing to extract or interpolate the correct media views to match the features of the client's presentation system, if such NN models are available at the client endpoint.

The client device 908 then follows with a response 1310 from client device 908 to network orchestrator 905 provided as a client token, application token, and one or more NN model tokens (if such NN model tokens are available at the client endpoint). The network orchestrator 905 then provides the client device with a Session ID token 1311. The network orchestrator 905 then requests ingest media 1312 from a ingest media server 1303. The ingest media server 1303 may include, for example, the ingest media storage 903 or the ingest media format and assets the storage device 1002. The request for ingest media 1312 may also include the URN or other standard name for the media identified in request 1308. The ingest media server 1303 replies to the ingest media 1312 request with a response 1313 which includes an ingest media token. The network orchestrator 905 then provides the media token from the response 1313 in a call 1314 to the client device 908. The network orchestrator 905 then initiates the adaptation process for the requested media in request 1315 by providing the adaptation and fragmentation module 910 with the ingest media token, client token, application token, and NN model tokens. The adaptation and fragmentation module 910 requests access to the ingest media by providing the ingest media server 1303 with the ingest media token at request 1316 to request access to the ingest media assets.

The ingest media server 1303 responds to the request 1316 with an ingest media access token in a response 1317 to the adaptation and fragmentation module 910. The adaptation and fragmentation module 910 then requests that media adaptation process 1000 adapt the ingest media located at the ingest media access token for the client, application, and NN inference models corresponding to the session ID token created and transmitted at the response 1313. A request 1318 from the adaptation and fragmentation module 910 to the media adaptation process 1000 is made. The request 1318 contains the required tokens and session ID. The media adaptation process 1000 provides the network orchestrator 905 with an adapted media access token and session ID in an update response 1319. The network orchestrator 905 then provides the media packaging module 11043 with the adapted media access token and session ID in an interface call 1320. The media packaging module 11043 provides a response 1321 to the network orchestrator 905 with the packaged media access token and session ID in the response 1321. The media packaging module 11043 then provides, in response 1322, the packaged assets, URNs, and the packaged media access token for the session ID to a packaged media server 1307 to be stored. Subsequently, the client device 908 executes a request 1323 to the packaged media server 1307 to initiate the streaming of media assets corresponding to the packaged media access token received in the response 1321. Finally, the client device 908 executes other requests and provides status updates in message 1324 to the network orchestrator 905.

Figure 14A:
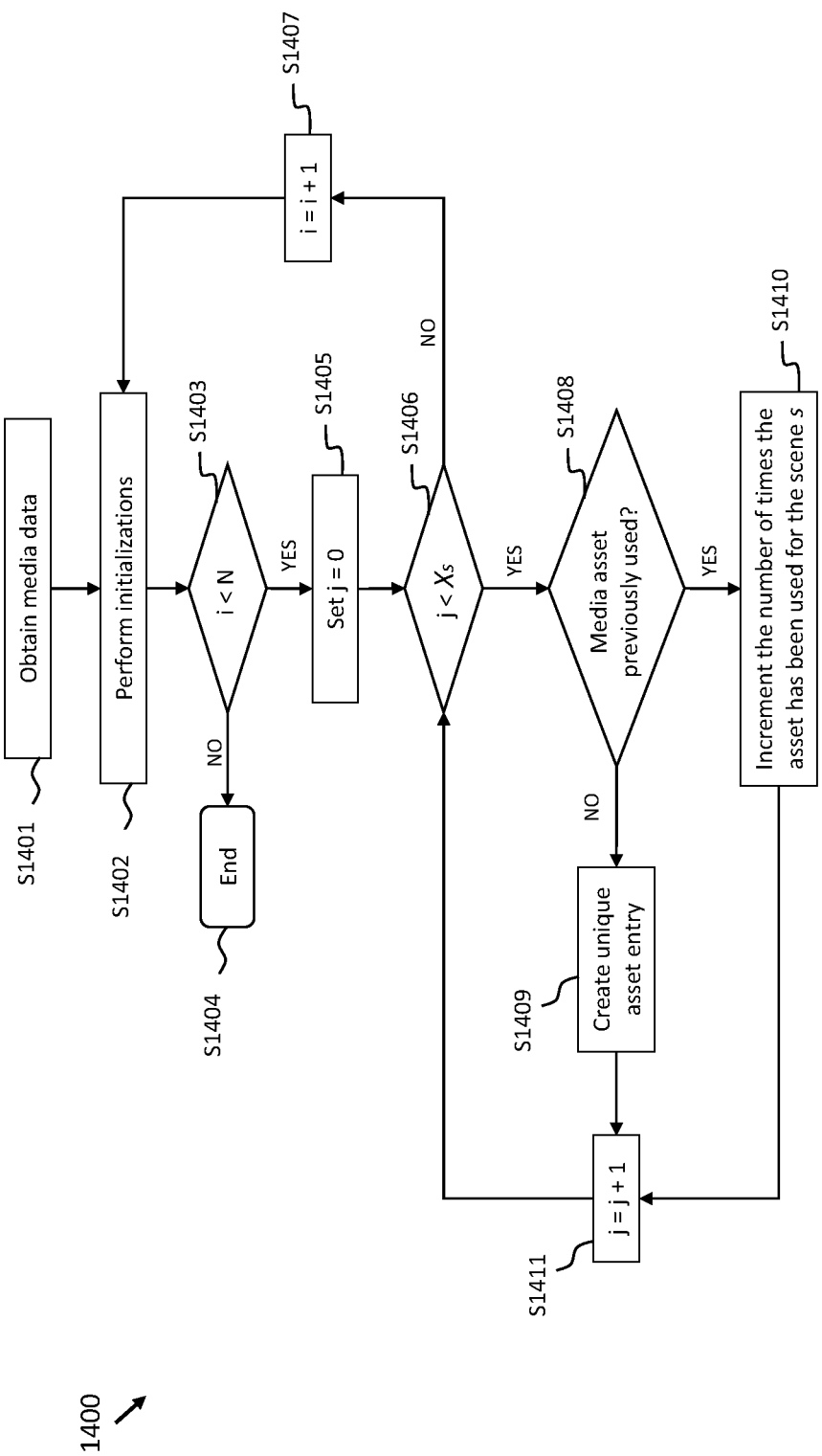
FIG. 14A is a workflow illustrating a method of a media reuse analyzer, according to embodiments.

FIG. 14A illustrates a workflow for the media reuse analyzer 911 shown in FIG. 9. The media reuse analyzer 911 analyses metadata related to the uniqueness of an object of a scene included in the media data.

At S1401, media data is obtained from, e.g., a content provider or content source. At S1402, initialization is performed. Specifically, an iterator "i" is initialized to zero. The iterator may be, for example, a counter. A set of lists of unique assets 1420 (shown in FIG. 14B) for each scene that identify unique assets encountered among all scenes comprising a presentation (as shown in FIG. 3 and/or FIG. 4) are also initialized.

At S1403, a decision process is performed to determine if a value of the iterator "i" is less than the total number of scenes N comprising the presentation. If the value of the iterator "i" is equal to (or greater than) the number of scenes N comprising the presentation (NO at S1403), then the processing proceeds to S1404 wherein the reuse analysis is terminated (i.e., the process ends). If the value of the iterator "i" is less than the number of scenes N comprising the presentation (YES at S1403), then the processing proceeds to S1405. At S1405, the value of an iterator "j" is set to zero.

Subsequently, at S1406, a decision process is performed to determine if the value of the iterator "j" it is less than the total number of media assets X (also referred to as media objects) in a current scene. If the value of the iterator "j" is equal to (or greater than) the total number of media assets X for scene s (NO at S1406), then the processing proceeds to S1407 wherein the iterator "i" is incremented by 1 before returning to S1403. If the value of the iterator "j" is less than the total number of media assets X for scene s (YES at S1406), then the processing proceeds to S1408.

At S1408, the features of the media assets are compared to assets previously analyzed from scenes prior to the current scene (i.e., scene s) to determine if a current media asset has previously been used.

If the current media asset has been identified as a unique asset (NO at S1408), i.e., the current media asset has not previously been analyzed in scenes associated with smaller values of iterator "i", then the processing proceeds to S1409. At S1409, a unique asset entry is created in the set of lists of unique assets 1420 corresponding to the current scene (i.e., scene s). A unique identifier is also assigned to the unique asset entry, and the number of times (e.g., the frequency) that the asset has been used across scenes 0 to N−1 is set to 1. Then, the processing proceeds to S1411.

If the current media asset has been identified as an asset used in one or more scenes prior to scene s (YES at S1408), then the processing proceeds to S1409. At S1410, the number of times the current media asset has been used across scenes 0 to N−1 is incremented by 1 in the set of lists of unique assets 1420 corresponding to the current scene (i.e., scene s). Then, the processing proceeds to S1411.

At S1411, the value of the iterator "j" is incremented by 1. Subsequently, the processing returns to S1406.

In some embodiments, the media reuse analyzer 911 may further signal the client, for example client device 108, that the client should use a copy of the asset for each instance (following the first time that the asset was distributed to the client) that asset is used in a set of at scenes.

Note that the steps in the sequence diagram and workflow described with reference to FIGS. 13-14 are not intended to limit the configuration of data and communication flow in embodiments. For example, one or more of the steps may be performed simultaneously, data may be stored and/or flow to in directions not explicitly illustrated in the flow of FIGS. 13-14A, etc.

FIG. 14B is an example of the set of lists of unique assets 1420 initialized in S1402 (and potentially updated at S1409-

S1410) for all scenes upon completion of the presentation, according to embodiments. A list of unique assets in the set of lists of unique assets 1420 may be identified a priori or pre-defined by the network or the client device. The set of lists of unique assets 1420 shows a sample list of entries of information describing assets that are unique with respect to the entire presentation, including an indicator for the type of media (e.g., Mesh, Audio, or Volume) that comprise the asset, a unique identifier for the asset, and the number of times that the asset is used across the set of scenes that comprise the entire presentation. As an example, for Scene N−1, there are no assets included in its list because all assets that are required for Scene N−1 have been identified as assets that are also used in Scenes 1 and Scene 2.

Figure 15:
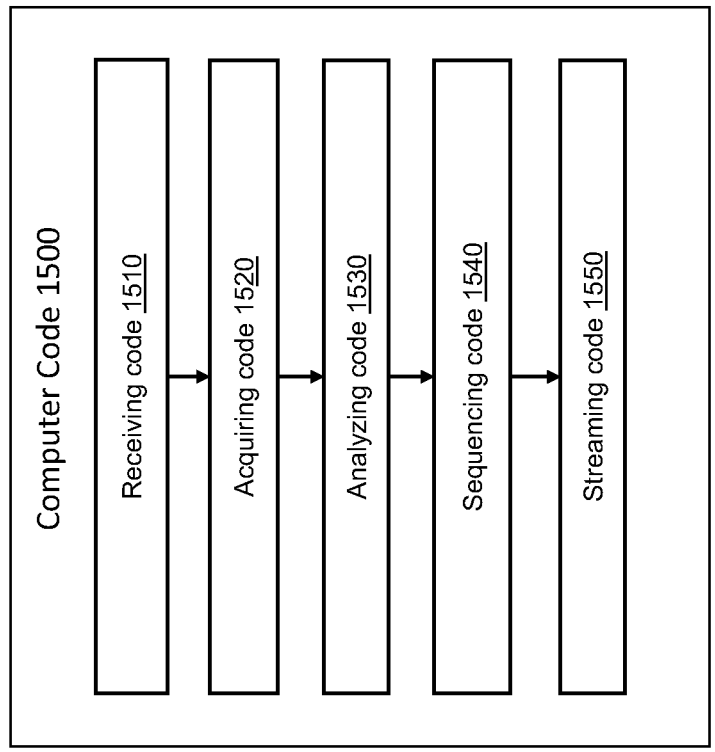
FIG. 15 is a block diagram of an example of computer code for a media reuse analyzer, according to embodiments.

FIG. 15 a block diagram of an example of computer code 1500 for for packaging media for optimizing immersive media distribution, according to embodiments. In embodiment, the computer code may be, for example, program code or computer program code. According to embodiments of the present disclosure, an apparatus/device including at least one processor with memory storing computer program code may be provided. The computer program code may be configured to, when executed by the at least one processor, perform any number of aspects of the present disclosure.

As shown in FIG. 15, the computer code 1500 may include receiving code 1510, acquiring code 1520, analyzing code 1530, sequencing code 1540, and streaming code 1550.

The receiving code 1510 is configured to cause the at least one processor to receive immersive media data for an immersive presentation.

The acquiring code 1520 is configured to cause the at least one processor to acquire asset information associated with media assets corresponding to a set of scenes included in the immersive media data for the immersive presentation.

The analyzing code 1530 is configured to cause the at least one processor to analyze characteristics of the media assets based on the asset information, the characteristics comprising an asset type associated with a respective media asset and a frequency that indicates a number of times the respective media asset is used among the set of scenes included in the immersive presentation.

The sequencing code 1540 is configured to cause the at least one processor to order the media assets in a sequence based on the asset type and the frequency associated with each media asset.

The streaming code 1550 is configured to cause the at least one processor to stream the immersive media data for the immersive presentation based on the ordered sequence of the media assets.

Although FIG. 15 shows example blocks of code, in some implementations, the apparatus/device may include additional blocks, fewer blocks, different blocks, or differently arranged blocks than those depicted in FIG. 15. Additionally, or alternatively, two or more of the blocks of the apparatus/device may be combined. In other words, while FIG. 15 shows distinct blocks of code, the various code instructions need not be distinct and could be intermingled.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for packaging media for optimizing immersive media distribution, performed by at least one processor, the method comprising:
    receiving immersive media data for an immersive presentation;
    acquiring asset information associated with media assets, wherein the media assets are three-dimensional (3D) objects having multiple layers;
    analyzing characteristics of the media assets based on the asset information, the characteristics comprising a frequency associated with a respective media asset, wherein the frequency associated with the respective media asset is indicated in a base layer among the multiple layers associated with the respective media asset; and
    ordering the media assets in a sequence based on the frequency associated with each of the media assets.

2. The method according to claim 1, wherein the sequence of the media assets are ordered by increasing or decreasing frequency.

3. The method according to claim 1, wherein the immersive media data includes one or more scenes and the one or more scenes are timed, untimed, or a combination of timed and untimed scenes.

4. The method according to claim 1, wherein the asset information includes a base representation of the respective media asset and a set of asset enhancement layers, the set of asset enhancement layers including attribute information corresponding to the characteristics of the media assets, and
    wherein when the set of asset enhancement layers are applied to the base representation of the media asset, the base representation of the respective media asset is augmented to include features that are not supported in the base layer containing the base representation of the media asset.

5. The method according to claim 1, further comprising:
    separating the sequence of the media assets into individual packets for representation and streaming on a network; and
    streaming the immersive media data for the immersive presentation based on the ordered sequence of the media assets.

6. The method according to claim 1, further comprising determining if a format of the immersive media data corresponding to scenes in the set of scenes is to be transformed from a first format to a second format before immersive media distribution, based on a complexity of the scenes; and
    determining, based on a determination that the immersive media data corresponding to the scenes is to be transformed, if a source of the immersive media data or a client of the immersive media data is to perform a transformation from the first format to the second format.

7. The method according to claim 1, further comprising:
    determining if the respective media asset has previously been streamed; and
    if it is determined that the respective media asset has previously been streamed, creating a proxy to substitute the respective media asset in the sequence of the media assets.

8. A device for packaging media for optimizing immersive media distribution, the device comprising:
    at least one memory configured to store computer program code; and at least one processor configured to read the computer program code and operate as instructed by the computer program code, the computer program code including:
  receiving code configured to cause the at least one processor to receive immersive media data for an immersive presentation;
  acquiring code configured to cause the at least one processor to acquire asset information associated with media assets, wherein the media assets are three-dimensional (3D) objects having multiple layers;
  analyzing code configured to cause the at least one processor to analyze characteristics of the media assets based on the asset information, the characteristics comprising a frequency associated with a respective media asset, wherein the frequency associated with the respective media asset is indicated in a base layer among the multiple layers associated with the respective media asset; and
  sequencing code configured to cause the at least one processor to order the media assets in a sequence based on the frequency associated with each of the media assets.

9. The device of claim 8, wherein the ordered sequence of the media assets are ordered by increasing or decreasing frequency.

10. The device of claim 8, wherein the immersive media data includes one or more scenes and the one or more scenes are timed, untimed, or a combination of timed and untimed scenes.

11. The device of claim 8, wherein the asset information includes a base representation of the respective media asset and a set of asset enhancement layers, the set of asset enhancement layers including attribute information corresponding to the characteristics of the media assets, and
  wherein when the set of asset enhancement layers are applied to the base representation of the media asset, the base representation of the respective media asset is augmented to include features that are not supported in the base layer containing the base representation of the media asset.

12. The device of claim 8, the computer program code further including:
  separating code configured to cause the at least one processor to separate the ordered sequence of the media assets into individual packets for representation and streaming on a network; and
  streaming code configured to cause the at least one processor to stream the immersive media data for the immersive presentation based on the ordered sequence of the media assets.

13. The device of claim 8, the computer program code further including:
  format determining code configured to cause the at least one processor to determine if a format of the immersive media data corresponding to scenes in the set of scenes is to be transformed from a first format to a second format before immersive media distribution, based on a complexity of the scenes; and
  transformation determining code configured to cause the at least one processor to determine, based on a determination that the immersive media data corresponding to the scenes is to be transformed, if a source of the immersive media data or a client of the immersive media data is to perform a transformation from the first format to the second format.

14. The device of claim 8, the computer program code further including:
  determining code configured to cause the at least one processor to determine if the respective media asset has previously been streamed; and
  proxy creating code configured to cause the at least one processor to create a proxy to substitute the respective media asset in the ordered sequence of the media assets, if it is determined that the respective media asset has previously been streamed.

15. A non-transitory computer-readable medium storing instructions that, when executed by at least one processor of a device for packaging media for optimizing immersive media distribution, cause the at least one processor to:
  receive immersive media data for an immersive presentation;
  acquire asset information associated with media assets, wherein the media assets are three-dimensional (3D) objects having multiple layers;
  analyze characteristics of the media assets based on the asset information, the characteristics comprising a frequency associated with a respective media asset, wherein the frequency associated with the respective media asset is indicated in a base layer among the multiple layers associated with the respective media asset; and
  order the media assets in a sequence based on the frequency associated with each of the media assets.

16. The non-transitory computer-readable medium of claim 15, wherein the ordered sequence of the media assets are ordered by increasing or decreasing frequency.

17. The non-transitory computer-readable medium of claim 15, wherein the instructions further cause the at least one processor to:
  separate the ordered sequence of the media assets into individual packets for representation and streaming on a network; and
  stream the immersive media data for the immersive presentation based on the ordered sequence of the media assets.

18. The non-transitory computer-readable medium of claim 15, wherein the asset information includes a base representation of the respective media asset and a set of asset enhancement layers, the set of asset enhancement layers including attribute information corresponding to the characteristics of the media assets, and
  wherein when the set of asset enhancement layers are applied to the base representation of the media asset, the base representation of the respective media asset is augmented to include features that are not supported in the base layer containing the base representation of the media asset.

19. The non-transitory computer-readable medium of claim 15, wherein the instructions further cause the at least one processor to:
  determine if a format of the immersive media data corresponding to scenes in the set of scenes is to be transformed from a first format to a second format before immersive media distribution, based on a complexity of the scenes; and
  determine, based on a determination that the immersive media data corresponding to the scenes is to be transformed, if a source of the immersive media data or a client of the immersive media data is to perform a transformation from the first format to the second format.

20. The non-transitory computer-readable medium of claim 15, wherein the instructions further cause the at least one processor to:
- determine if the respective media asset has previously been streamed; and
- create a proxy to substitute the respective media asset in the ordered sequence of the media assets, if it is determined that the respective media asset has previously been streamed.

* * * * *